(12) United States Patent
Ishigami

(10) Patent No.: US 12,475,592 B2
(45) Date of Patent: Nov. 18, 2025

(54) POSITIONING APPARATUS CAPABLE OF MEASURING POSITION OF MOVING BODY USING IMAGE CAPTURING APPARATUS

(71) Applicant: Panasonic Intellectual Property Management Co., Ltd., Osaka (JP)

(72) Inventor: Tomohide Ishigami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 809 days.

(21) Appl. No.: 17/123,861

(22) Filed: Dec. 16, 2020

(65) Prior Publication Data

US 2021/0101747 A1 Apr. 8, 2021

Related U.S. Application Data

(63) Continuation of application No. PCT/JP2019/046207, filed on Nov. 26, 2019.

(30) Foreign Application Priority Data

Dec. 28, 2018 (JP) ................................. 2018-247827

(51) Int. Cl.
 *G06T 7/73* (2017.01)
 *G01C 21/00* (2006.01)
 *G06Q 10/08* (2024.01)

(52) U.S. Cl.
 CPC .............. *G06T 7/73* (2017.01); *G01C 21/005* (2013.01); *G06Q 10/08* (2013.01)

(58) Field of Classification Search
 None
 See application file for complete search history.

(56) References Cited

U.S. PATENT DOCUMENTS

2006/0167595 A1\* 7/2006 Breed ................. B60R 21/0152
 701/1
2009/0115638 A1\* 5/2009 Shankwitz ........... G08G 1/0104
 340/988

(Continued)

FOREIGN PATENT DOCUMENTS

JP 2011-219229 11/2011

OTHER PUBLICATIONS

English translation of International Preliminary Report on Patentability ssued Jul. 8, 2021 in International (PCT) Application No. PCT/JP2019/046207.

(Continued)

*Primary Examiner* — Donald J Wallace
*Assistant Examiner* — Paysun Wu
(74) *Attorney, Agent, or Firm* — Wenderoth, Lind & Ponack, L.L.P.

(57) ABSTRACT

A first calculator calculates a relative position and a relative attitude of a vehicle based on images captured by an image capturing apparatus mounted on the vehicle. A second calculator extracts one marker from an image captured by the image capturing apparatus, and calculates an absolute position and an absolute attitude of the vehicle based on the position and the attitude of the one extracted marker. A corrector corrects the relative position and the relative attitude based on the absolute position and the absolute attitude to generate a corrected position and a corrected attitude of the vehicle. When an angular difference between a traveling direction of the vehicle having the corrected position and the corrected attitude, and the direction of the passageway is smaller than a predetermined threshold, the corrector corrects the relative attitude based on the direction of the passageway, instead of the absolute attitude.

17 Claims, 21 Drawing Sheets

(56) References Cited

U.S. PATENT DOCUMENTS

| | | | | |
|---|---|---|---|---|
| 2012/0176491 | A1* | 7/2012 | Garin | G01S 19/49 |
| | | | | 348/113 |
| 2014/0039676 | A1* | 2/2014 | Fernando | G05D 1/024 |
| | | | | 901/1 |
| 2016/0238394 | A1* | 8/2016 | Iimura | G06T 7/20 |
| 2017/0024617 | A1* | 1/2017 | Yamaguchi | G06V 20/52 |
| 2017/0241786 | A1* | 8/2017 | Ohira | G01P 7/00 |
| 2018/0058882 | A1* | 3/2018 | Hodohara | G01C 25/005 |

OTHER PUBLICATIONS

International Search Report issued Feb. 18, 2020 in International (PCT) Application No. PCT/JP2019/046207.
R. Mur-Artal, et al., "ORB-SLAM2: an Open-Source SLAM System for Monocular, Stereo and RGB-D Cameras", IEEE Transactions on Robotics, vol. 33, Issue: 5, Oct. 2017.
Extended European Search Report issued Feb. 8, 2022 in corresponding European Patent Application No. 19903228.5.
Lamberti, F. et al., "Mixed marker-based/marker-less visual odometry system for mobile robots" International Journal of Advanced Robotic Systems, Apr. 22, 2013, vol. 10, pp. 1-11.
Parra Alonso, I. et al., "Accurate Global Localization Using Visual Odometry and Digital Maps on Urban Environments", IEEE Transactions on Intelligent Transportation Systems, Dec. 4, 2012, vol. 13, No. 4, pp. 1535-1545.

\* cited by examiner

Fig. 4
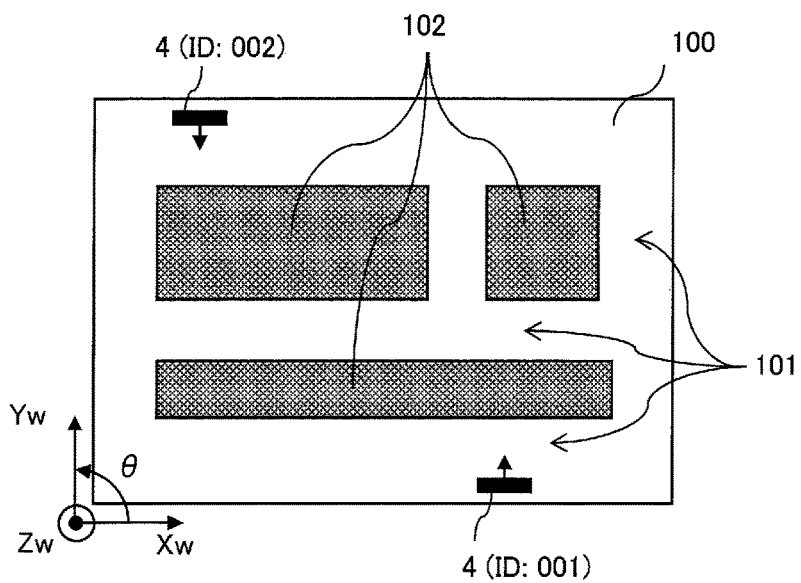
Fig. 5
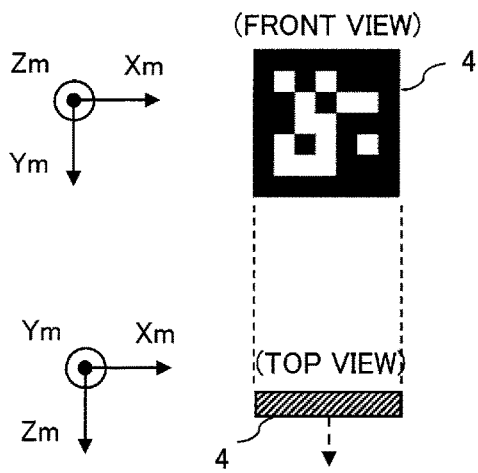
Fig. 6
| ID | POSITION Xw [m] | POSITION Yw [m] | POSITION Zw [m] | ANGLE $\theta$ [rad] | SIZE [m] |
|---|---|---|---|---|---|
| 001 | 50 | 5 | 1 | $\pi/2$ | 0.30 |
| 002 | 10 | 30 | 1 | $3\pi/2$ | 0.30 |

POSITIONING APPARATUS CAPABLE OF MEASURING POSITION OF MOVING BODY USING IMAGE CAPTURING APPARATUS

This is a continuation application of International Application No. PCT/JP2019/046207, with an international filing date of Nov. 26, 2019, which claims priority of Japanese patent application No. 2018-247827 filed on Dec. 28, 2018, the content of which is incorporated herein by reference.

BACKGROUND

1. Technical Field

TECHNICAL FIELD

The present disclosure relates to a positioning apparatus for measuring a position of a moving body, such as a vehicle, and a moving body including such a positioning apparatus.

2. DESCRIPTION OF RELATED ART

When moving cargo within a predetermined area or between predetermined points using a cargo transporting vehicle, it may be required to measure and track a position of the vehicle. For example, Japanese Patent Laid-open Publication No. JP 2011-219229 A discloses a cargo location management device for measuring a position of a vehicle using a positioning technology, such as GPS, wireless LAN positioning, and infrared positioning.

When measuring a position of a vehicle moving outdoors, GPS positioning is typically used. On the other hand, radio waves from GPS satellites can not be received indoors, e.g., inside a warehouse and a factory, etc., and therefore, GPS positioning can not be used. Examples of indoor positioning methods include a method using wireless signals of, for example, ultra wide band (UWB), Wi-Fi, or Bluetooth (registered trademark) Low Energy (BLE), etc. However, the positioning method using wireless signals requires that the a large number of wireless transmitters for transmitting wireless signals are disposed in a moving area of the vehicle, thus requiring high initial costs. In addition, there is an indoor positioning method, called Pedestrian Dead Reckoning (PDR). However, it is difficult to accurately measure positions using the PDR.

For example, there is a technology called Visual Simultaneous Localization and Mapping (Visual-SLAM) as disclosed in R. Mur-Artal, et al., "ORB-SLAM2: an Open-Source SLAM System for Monocular, Stereo and RGB-D Cameras", IEEE Transactions on Robotics, Volume: 33, Issue: 5, October 2017, for accurately measuring and tracking a position of a moving body, such as a vehicle, without requiring a large number of wireless transmitters for transmitting wireless signals. According to Visual-SLAM, a moving body provided with an image capturing apparatus moves and captures images around the moving body, and then, an amount of movement of the moving body is calculated based on amounts of movement of feature points in the captured images. Thus, it is possible to estimate a current position of the moving body, and generate a map based on a trajectory of the moving body.

SUMMARY

In a situation where a background varies day by day, such as in a factory and a warehouse, it is difficult to determine a current position using a map created in advance. In this case, a position of a moving body obtained by the Visual-SLAM is calculated as a relative position with respect to a reference position (for example, a start position from which the moving body travels), and therefore, an errors cumulatively increases with a lapse of time. Hence, there is a demand for a positioning apparatus capable of measuring a position of a moving body using an image capturing apparatus, with a smaller error than that of the prior art.

One non-limiting and exemplary embodiment provides a positioning apparatus capable of measuring a position of a moving body using an image capturing apparatus, with a smaller error than that of the prior art.

According to an aspect of the present disclosure, a positioning apparatus is provided with a first calculator, a storage apparatus, a second calculator, and a corrector. The first calculator calculates a first position and a first attitude of a moving body indicating a relative position and a relative attitude of the moving body with respect to a reference position and a reference attitude, based on a plurality of images captured by an image capturing apparatus mounted on the moving body. The storage apparatus stores information on identifiers, positions, and attitudes of a plurality of markers disposed at predetermined positions and visually distinguishable from each other, and information on a map containing a passageway for the moving body. The second calculator extracts one of the plurality of markers from an image captured by the image capturing apparatus, and calculates a second position and a second attitude of the moving body indicating a position and an attitude of the moving body in the map, based on a position and an attitude of the one extracted marker. The corrector corrects the first position and the first attitude based on the second position and the second attitude to generate a corrected position and a corrected attitude of the moving body. When the one extracted marker is disposed along the passageway, and an angular difference between a traveling direction of the moving body having the corrected position and the corrected attitude, and a direction of the passageway is smaller than a predetermined first threshold, the corrector corrects the first attitude based on the direction of the passageway, instead of the second attitude.

These general and specific aspects may be achieved by a system, a method, a computer program, and any combination of the system, the method, and the computer program.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

According to the one aspect of the present disclosure, it is possible to accurately measure the position and the attitude of the moving body, by correcting the first position and the first attitude based on the second position and the second attitude. In addition, according to the one aspect of the present disclosure, when correcting the first position and the first attitude based on the second position and the second attitude, it is possible to reduce an effect of an error in the second attitude by correcting the first attitude of the moving body based on the direction of the passageway, and thus, more accurately measure the position and the attitude of the moving body.

BRIEF DESCRIPTION OF DRAWINGS

FIG. 4 is a map of a warehouse 100 including passageways 101 through which the vehicle 1 of FIG. 1 travels.

FIG. 5 is a diagram showing an example of a marker 4 of FIG. 4.

FIG. 6 is a table showing an example of marker information stored in a storage apparatus 35 of FIG. 3.

DETAILED DESCRIPTION

Embodiments according to the present disclosure will hereinafter be described with reference to the drawings. Note that similar constituent elements in the following respective embodiments are given identical reference signs.

First Embodiment

With reference to FIGS. 1 to 24, a positioning apparatus according to a first embodiment, and a moving body provided with such a positioning apparatus will be described.

[Configuration of First Embodiment]

[Overall Configuration]

Figure 1:
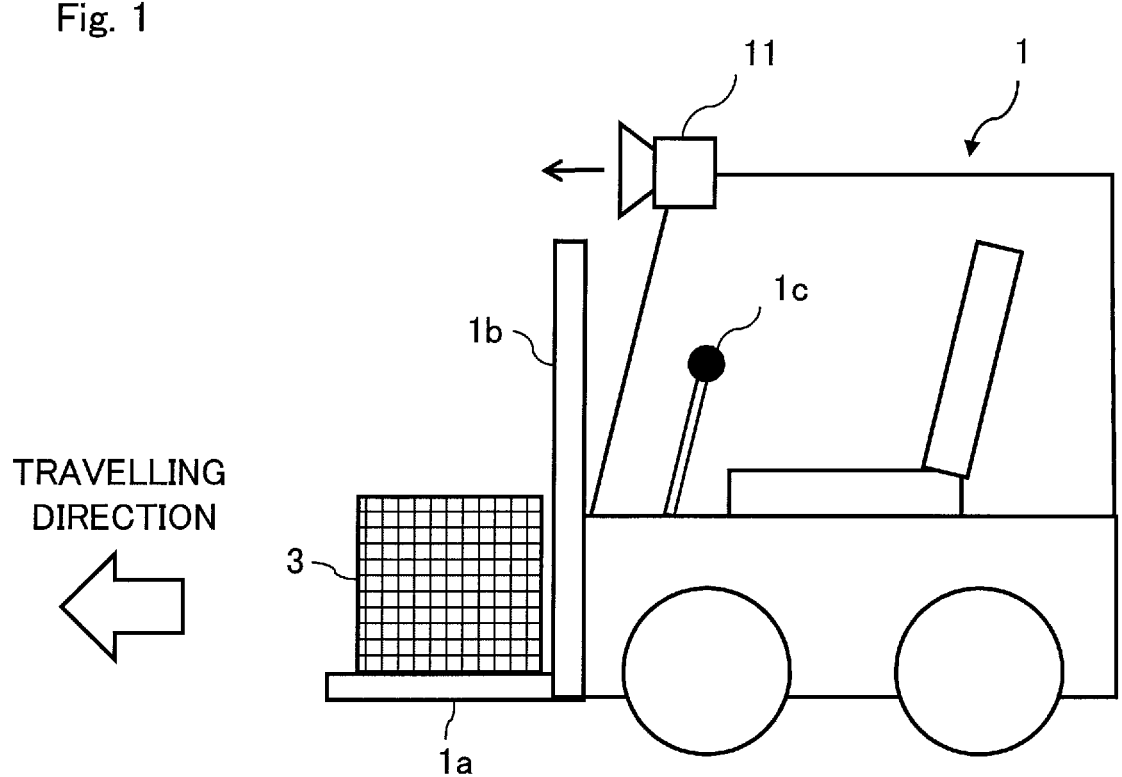
FIG. 1 is a schematic diagram showing a configuration of a vehicle 1 according to a first embodiment.

FIG. 1 is a schematic diagram showing a configuration of a vehicle 1 according to the first embodiment. The vehicle 1 may be a manned vehicle, such as a forklift or a truck. In addition, the vehicle 1 is provided with a cargo carrier 1a on which cargo 3 is carried. The vehicle 1 may be further provided with an elevating mechanism 1b for loading and unloading the cargo 3 on the cargo carrier 1a. In addition, the vehicle 1 is provided with a console 1e for receiving user operations, such as forward, backward, steering, and stop. In addition, on a body of the vehicle 1, an image capturing apparatus 11 is mounted for capturing images in a predetermined direction with respect to the vehicle 1 (forward, backward, side, upward, and/or downward directions).

Figure 2:
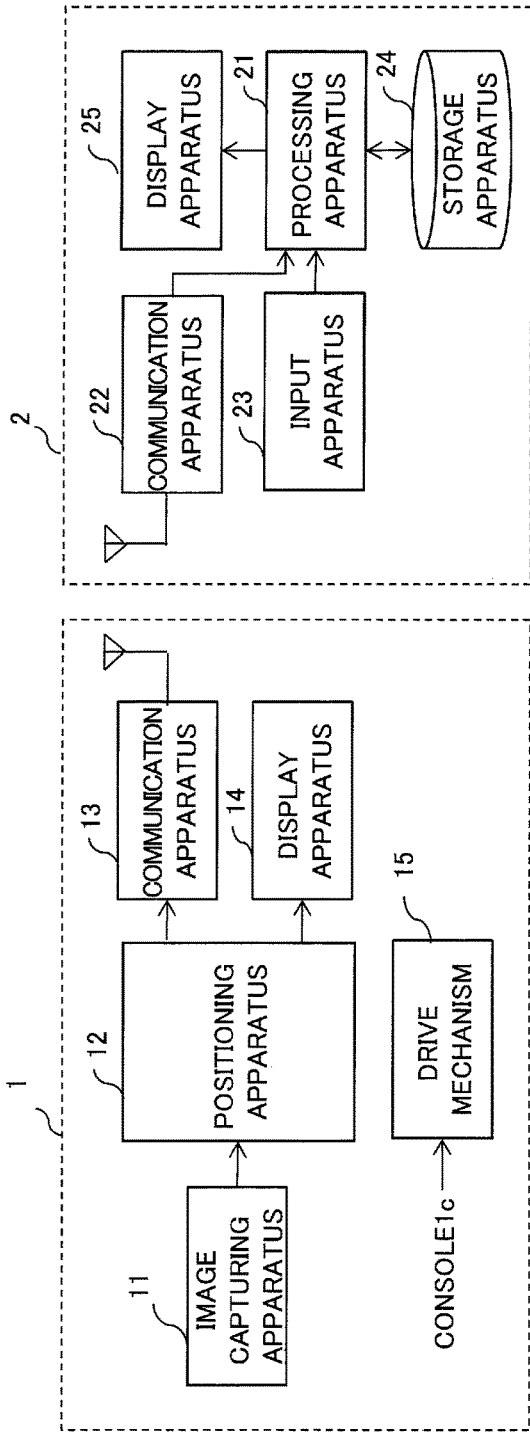
FIG. 2 is a block diagram showing a configuration of a positioning system including the vehicle 1 of FIG. 1.

FIG. 2 is a block diagram showing a configuration of a positioning system including the vehicle 1 of FIG. 1. The positioning system of FIG. 2 includes at least one vehicle 1 and a server apparatus 2. Each vehicle 1 includes a positioning apparatus 12 that measures a position of the vehicle 1 based on images captured by the image capturing apparatus 11. The server apparatus 2 obtains positions of the vehicles 1 from the vehicles 1, and records the positions of the vehicles 1.

[Configuration of Vehicle 1]

The vehicle 1 is provided with the image capturing apparatus 11, the positioning apparatus 12, a communication apparatus 13, a display apparatus 14, and a drive mechanism 15.

The image capturing apparatus 11 generates images of some object in a predetermined direction with respect to the vehicle 1, at certain time intervals, while the vehicle 1 is traveling. For example, the image capturing apparatus 11 includes at least one camera. The image capturing apparatus 11 may capture still images at certain time intervals, or may extract frames from a series of video frames at certain time intervals. The image capturing apparatus 11 sends the captured images to the positioning apparatus 12. The image capturing apparatus 11 provides each image with a timestamp of a time when the image is captured.

The positioning apparatus 12 measures the position of the vehicle 1 based on the images captured by the image capturing apparatus 11. The positioning apparatus 12 extracts feature points from the images captured by the image capturing apparatus 11, associates the extracted feature points among the images, and calculates a relative position and a relative attitude of the vehicle 1 with respect to a reference position and a reference attitude, based on changes of the feature points among the images. In addition, the positioning apparatus 12 extracts one of a plurality of markers disposed at predetermined positions and visually distinguishable from each other, from an image captured by the image capturing apparatus 11, and calculates an absolute position and an absolute attitude of the vehicle 1 in a map given in advance, based on the one extracted marker. The positioning apparatus 12 further corrects the relative position and the relative attitude based on the absolute position and the absolute attitude.

In the present specification, the "attitude" of the vehicle 1 indicates, for example, an angle of a traveling direction of the vehicle 1 with respect to a coordinate axe of a certain coordinate system ("world coordinate system" or "marker coordinate system" described below).

The communication apparatus 13 is provided with modules and control programs of Wi-Fi or Bluetooth, etc., to wirelessly communicate with the server apparatus 2. The communication apparatus 13 transmits the position and the attitude of the vehicle 1 calculated by the positioning apparatus 12, to the server apparatus 2.

The display apparatus 14 may display the position of the vehicle 1 on the map. In addition, the display apparatus 14 may display an alarm regarding an operation of the vehicle 1, and others.

The drive mechanism 15 includes an engine or a motor, a steering apparatus, a braking apparatus, and a control apparatus thereof, for the vehicle 1. The drive mechanism 15 is controlled, for example, through the console 1c by a user.

[Configuration of Server Apparatus 2]

The server apparatus 2 of FIG. 2 is provided with a processing apparatus 21, a communication apparatus 22, an input apparatus 23, a storage apparatus 24, and a display apparatus 25. The processing apparatus 21 is, for example, a general-purpose computer including a processor, a memory, and the like. The communication apparatus 22 is communicatively connected to the communication apparatus 13 of the vehicle(s) 1. The input apparatus 23 includes a keyboard, a pointing device, and the like. The storage apparatus 24 records the position and the attitude of the vehicle(s) 1 received from the vehicle(s) 1. The display apparatus 25 displays the position and the attitude of the vehicle(s) 1 received from the vehicle(s) 1. The processing apparatus 21 obtains the position of the vehicle(s) 1 from the vehicle(s)s 1 via the communication apparatus 22, records the position of the vehicle(s) 1 in the storage apparatus 24, and displays the position of the vehicle(s) 1 on the display apparatus 25.

The display apparatus 25 displays the position and the attitude of the vehicle 1 calculated by the positioning apparatus 12 of the vehicle 1. The processing apparatus 21 may obtain in advance a map of a movable range of the vehicle 1 (such as a warehouse or a factory), and display the position and the attitude of the vehicle 1 calculated by the positioning apparatus 12, on the display apparatus 25, such that the position and the attitude are overlaid on this map. Alternatively, the processing apparatus 21 itself may generate a map based on a travelling path of the vehicle 1, and display this map on the display apparatus 25.

[Configuration of Positioning Apparatus 12]

Figure 3:
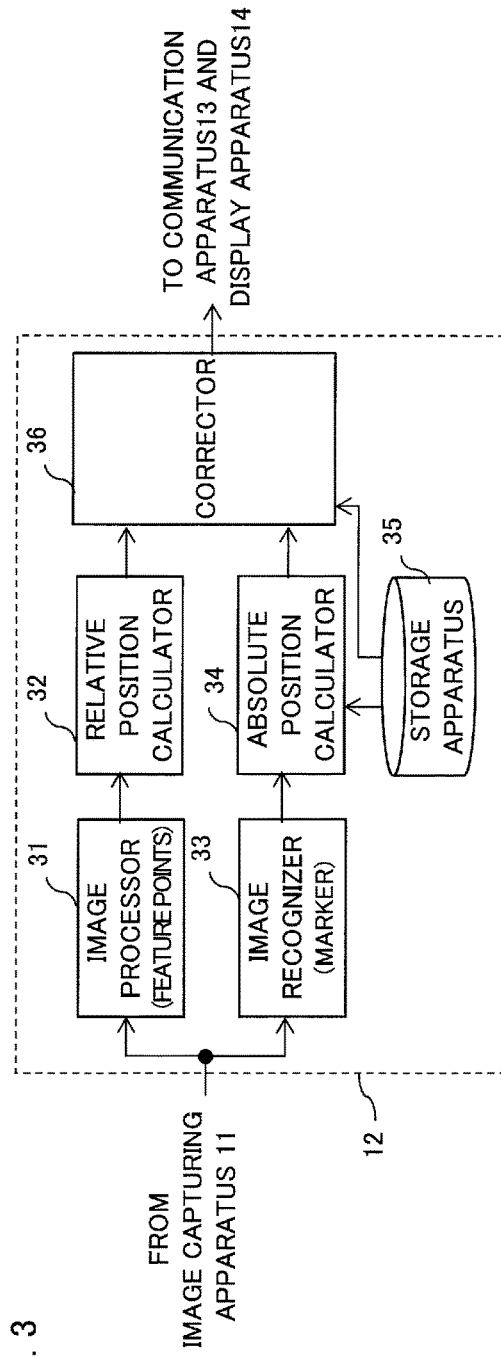
FIG. 3 is a block diagram showing a configuration of a positioning apparatus 12 of FIG. 2.

FIG. 3 is a block diagram showing a configuration of the positioning apparatus 12 of FIG. 2. The positioning apparatus 12 is provided with an image processor 31, a relative position calculator 32, an image recognizer 33, an absolute position calculator 34, a storage apparatus 35, and a corrector 36.

The storage apparatus 35 stores information on identifiers, positions, and attitudes of a plurality of markers 4 disposed at predetermined positions and visually distinguishable from each other, and information on a map including passageways for the vehicle 1 (for example, a map of the warehouse 100 described with reference to FIG. 4). The positions of the markers 4 may be represented as relative positions with respect to a reference position, and/or may be represented in association with the map.

FIG. 4 is a map of the warehouse 100 including passageways 101 through which the vehicle 1 of FIG. 1 travels. The warehouse 100 includes structures, such as a plurality of the passageways 101, and a plurality of shelves 102. The plurality of markers 4 are disposed in advance at a plurality of predetermined positions in the warehouse 100. The vehicle 1 of FIG. 1 travels through the passageways 101 to transport the cargo 3 from one of the shelves 102 to another one of the shelves 102. The positions of the vehicle 1 and the markers 4 are represented using a world coordinate system (Xw, Yw, Zw) determined for the entire warehouse 100.

FIG. 5 is a diagram showing an example of the marker 4 of FIG. 4. In the example of FIG. 5, the marker 4 is configured as a square flat plate. On one side of the marker 4, the marker 4 has a visually distinguishable pattern, into which an identifier of the marker 4 itself is encoded. In the example of FIG. 5, the marker 4 has a pattern constituted of 7×7 white or black square cells in the longitudinal and lateral directions. The pattern of the marker 4 is further configured such that the attitude of the marker 4 itself can be detected from an image of the marker 4, such as a marker used in a field of augmented reality (also referred to as a "AR marker"). Each marker 4 has a marker coordinate system (Xm, Ym, Zm) whose origin is located at an arbitrary point of the marker 4 (for example, center, or one vertex). In the lower part of FIG. 5 and other figures, a front surface of the marker 4 (positive direction of Zm axis) is indicated by an arrow at the center of a surface along an Xm-Ym plane.

FIG. 6 is a table showing an example of marker information stored in the storage apparatus 35 of FIG. 3. The example of FIG. 6 indicates information on the two markers 4 shown in FIG. 4. The markers 4 have identifiers 001 and 002, respectively. Each of the identifiers is encoded into the pattern of the corresponding marker 4. In addition, each of the markers 4 has certain coordinates in the world coordinate system (Xw, Yw, Zw). In addition, each of the markers 4 is disposed in such an attitude that the front surface (positive direction of Zm axis) of the marker 4 has an angle $\theta$ with respect to the Xw axis in an Xw-Yw plane (that is, azimuth angle). The attitude of each of the markers 4 may be represented by an azimuth angle and an elevation angle. In addition, each of the markers 4 has a size of 30 cm×30 cm.

The storage apparatus 35 stores marker information for all the markers 4, for example, including items shown in FIG. 6. In addition, the storage apparatus 35 also stores map information including directions, sizes, and arrangements of all the passageways 101.

Figure 7:
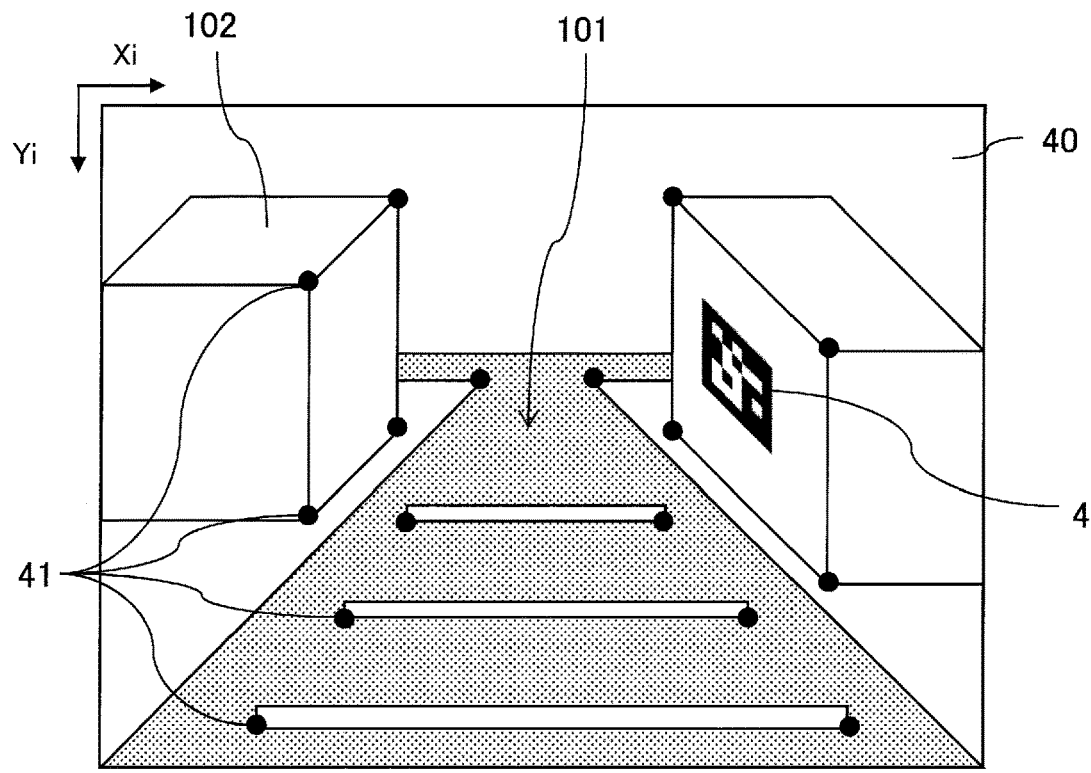
FIG. 7 is a diagram showing an example of an image 40 captured by an image capturing apparatus 11 of FIG. 1.

FIG. 7 is a diagram showing an example of the image 40 captured by the image capturing apparatus 11 of FIG. 1. The image 40 includes a plurality of feature points 41. Each of the feature points 41 is a point whose luminance or color is distinguishable from those of surrounding pixels, and whose position can be accurately determined. For example, each of the feature points 41 is detected from vertices or edges of structures, such as the passageways 101 or the shelves 102 through which the vehicle 1 travels, and detected from patterns on a floor, walls, or a ceiling. In addition, when the vehicle 1 passes near any one of the markers 4, the image 40 includes the corresponding marker 4. The positions of the feature points 41 and the marker 4 in the image 40 are represented by, for example, an image coordinate system (Xi, Yi) whose origin is located at any point in the image 40 (for example, upper left corner).

Again referring to FIG. 3, the image processor 31 extracts coordinates of the feature points corresponding to each other, from a plurality of images captured by the image capturing apparatus 11 at a plurality of time moments separated by a certain time length from each other. The relative position calculator 32 calculates an amount of movement of the vehicle 1 based on amounts of movement of the feature points in two images temporary adjacent to each other. Thus, the relative position calculator 32 calculates a relative position and a relative attitude of the vehicle 1 with respect to a reference position and a reference attitude (for example, a position and an attitude from which the vehicle 1 starts to travel), based on the coordinates of the feature points of the plurality of images. The relative position calculator 32 may calculate the relative position and the relative attitude of the vehicle 1 using known techniques for image processing and positioning, such as Visual-SLAM or Visual-Odometry. The reference position and the reference attitude are associated with the map information stored in the storage apparatus 35. In addition, the relative position calculator 32 provides the relative position and the relative attitude with a timestamp of an image associated with calculation of the relative position and the relative attitude (the latter of two images temporary adjacent to each other).

The relative position calculator 32 may represent the calculated position of the vehicle 1, for example, using Cartesian coordinates (XYZ coordinates). The relative position calculator 32 may calculate a velocity and/or an acceleration of the vehicle 1, based on the calculated position of the vehicle 1, and time. The relative position calculator 32 may represent the calculated attitude of the vehicle 1 as roll (left and right inclination), pitch (front and rear inclination), and yaw (rotation around an axis perpendicular to a floor surface (that is, the Zw axis in FIG. 4)). Thus, it is possible to represent not only a direction of the vehicle 1 in a horizontal plane parallel to the ground, but also an inclination of the body of the vehicle 1, and movement of the vehicle 1 in elevation.

In the present specification, the image processor 31 and the relative position calculator 32 are collectively referred to as a "first calculator". In addition, in the present specification, the relative position and relative attitude are referred to as a "first position" and a "first attitude", respectively.

The image recognizer 33 extracts one of the plurality of markers 4 disposed at predetermined positions and visually distinguishable from each other, from an image captured by the image capturing apparatus 11. The absolute position calculator 34 calculates the absolute position and the absolute attitude of the vehicle 1 indicating the position and the attitude of the vehicle 1 in the map (i.e., world coordinate system), by referring to the information on the markers 4 and the map information, both stored in the storage apparatus 35, based on the position and the attitude of the one extracted marker 4. In addition, the absolute position calculator 34 provides the absolute position and the absolute attitude with a timestamp of the image associated with calculation of the absolute position and the absolute attitude.

In the present specification, the image recognizer 33 and the absolute position calculator 34 are collectively referred to as a "second calculator". In addition, in the present specification, the absolute position and absolute attitude are referred to as a "second position" and a "second attitude", respectively.

The corrector 36 corrects the relative position and the relative attitude based on the absolute position and the absolute attitude to generate a corrected position and a corrected attitude of the vehicle 1. The corrector 36 synchronizes the absolute position and the absolute attitude with the relative position and the relative attitude, based on the timestamp of the relative position and the relative attitude, and based on the timestamp of the absolute position and the absolute attitude. The corrector 36 may consider the relative position and the relative attitude, and the absolute position and the absolute attitude, as positions and attitudes calculated from the same image, for example, when they have a time difference smaller than a predetermined threshold, and have timestamps closest to each other.

At least some of the components 31 to 36 of the positioning apparatus 12 may be integrated to each other. For example, the image processor 31 and the image recognizer 33 may be integrated to each other. In addition, the components 31 to 36 of the positioning apparatus 12 may be implemented as dedicated circuits, or as programs executed by a general-purpose processor.

[Operation of First Embodiment]

When continuing to calculate the relative position and the relative attitude over a certain time length, errors in the position and the attitude cumulatively increase with a lapse of time. The corrector 36 corrects the relative position and the relative attitude calculated from on the feature points 41 using Visual-SLAM or the like, based on the absolute position and the absolute attitude calculated from on the marker 4, as described above. If the absolute position and the absolute attitude are accurately calculated, it is possible to reduce accumulated errors produced when calculating the relative position and the relative attitude, and therefore, accurately calculate the position and the attitude of the vehicle 1. However, when disposing the markers 4, an error in the attitude of the marker 4 itself (also referred to as "disposition error") may occur. In this case, an angle of the marker 4 actually disposed is different from the angle θ of the marker 4 stored in the storage apparatus 35 (see FIG. 6). In addition, when calculating the absolute position and the absolute attitude, errors may occur, such as an error in the position or the attitude of the marker 4 as seen from the image capturing apparatus 11, and an error in the position or the attitude of the image capturing apparatus 11 as seen from the marker 4 (these are also referred to as "calculation errors"). The accuracy of the position and/or the attitude of the vehicle 1 may degrades doe to these errors.

Therefore, in the positioning apparatus 12 according to the first embodiment, the corrector 36 corrects the relative attitude of the vehicle 1 based on the direction of the passageway 101, instead of the absolute attitude of the vehicle 1, when it is determined that the vehicle 1 is travelling along the passageway 101. Specifically, when the one extracted marker 4 is disposed along the passageway 101, and an angular difference between a traveling direction of the vehicle 1 having the corrected position and the corrected attitude, and a direction of the passageway 101 is smaller than a predetermined threshold, the corrector 36 corrects the relative attitude based on the direction of the passageway 101, instead of the absolute attitude. Thus, when correcting the relative position and the relative attitude based on the absolute position and the absolute attitude, it is possible to reduce the effect of an error in the absolute attitude, and therefore, accurately measure the position and the attitude of the vehicle 1.

Next, an operation of the positioning apparatus 12 will be described in detail.

[Overall Positioning Process]

Figure 8:
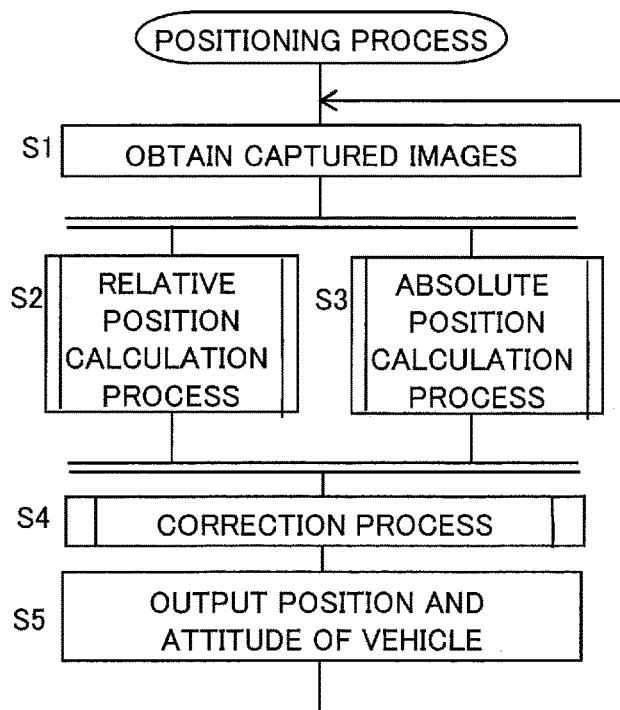
FIG. 8 is a flowchart showing a positioning process executed by the positioning apparatus 12 of FIG. 2.

FIG. 8 is a flowchart showing a positioning process executed by the positioning apparatus 12 of FIG. 2.

In step S1, the positioning apparatus 12 obtains the images captured by the image capturing apparatus 11. In step S2, the image processor 31 and the relative position calculator 32 execute a relative position calculation process to calculate a relative position and a relative attitude of the vehicle 1. In step S3, the image recognizer 33 and the absolute position calculator 34 execute an absolute position calculation process to calculate an absolute position and an absolute attitude of the vehicle 1. Steps S2 and S3 may be executed in parallel as shown in FIG. 8, or may be executed sequentially. In step S4, the corrector 36 executes a correction process to correct the relative position and the relative attitude based on the absolute position and the absolute attitude, and generate a corrected position and a corrected attitude of the vehicle 1. In step S5, the corrector 36 outputs the corrected position and the corrected attitude of the vehicle 1 to the communication apparatus 13 and the display apparatus 14.

[Relative Position Calculation Process]

Figure 9:
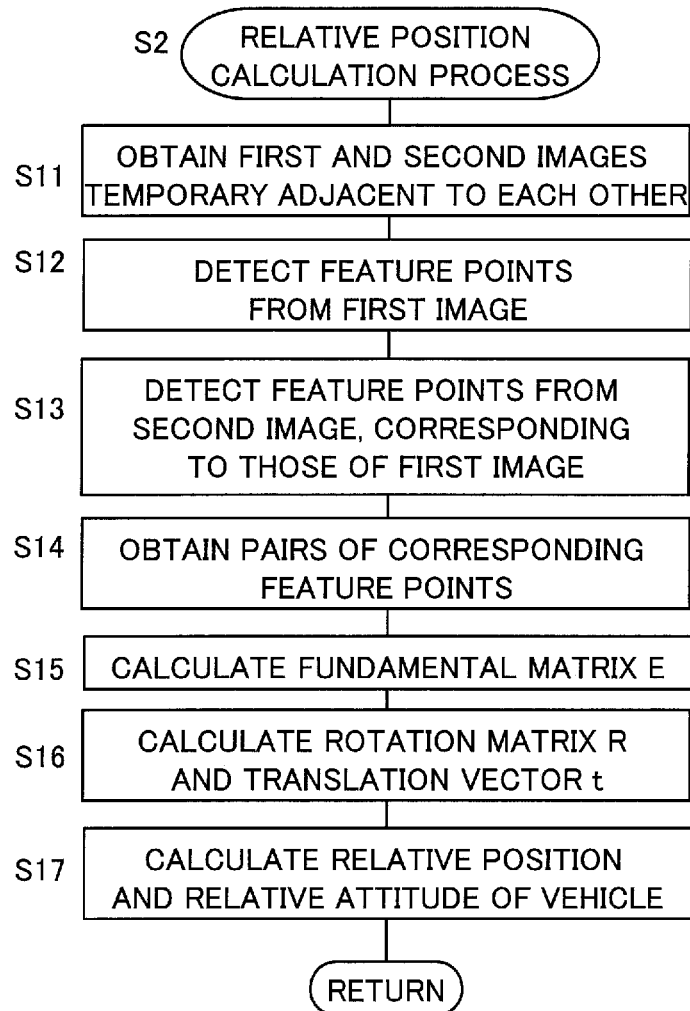
FIG. 9 is a flowchart showing a subroutine of step S2 (relative position calculation process) of FIG. 8.

FIG. 9 is a flowchart showing a subroutine of step S2 (relative position calculation process) of FIG. 8.

In step S11, the image processor 31 obtains first and second images captured at a first and a second time moments separated by a certain time length from each other (for example, first and second images of temporary adjacent frames).

In step S12, the image processor 31 detects feature points from the first image. Image processing techniques, such as the Features from Accelerated Segment Test (FAST), may be used to detect the feature points from the image.

In step S13, the image processor 31 detects feature points from the second image, corresponding to the feature points of the first image. Well-known image processing techniques, such as the Kanade-Lucas-Tomasi (KLT) tracker, may be used to detect the feature points corresponding among the images.

Figure 10:
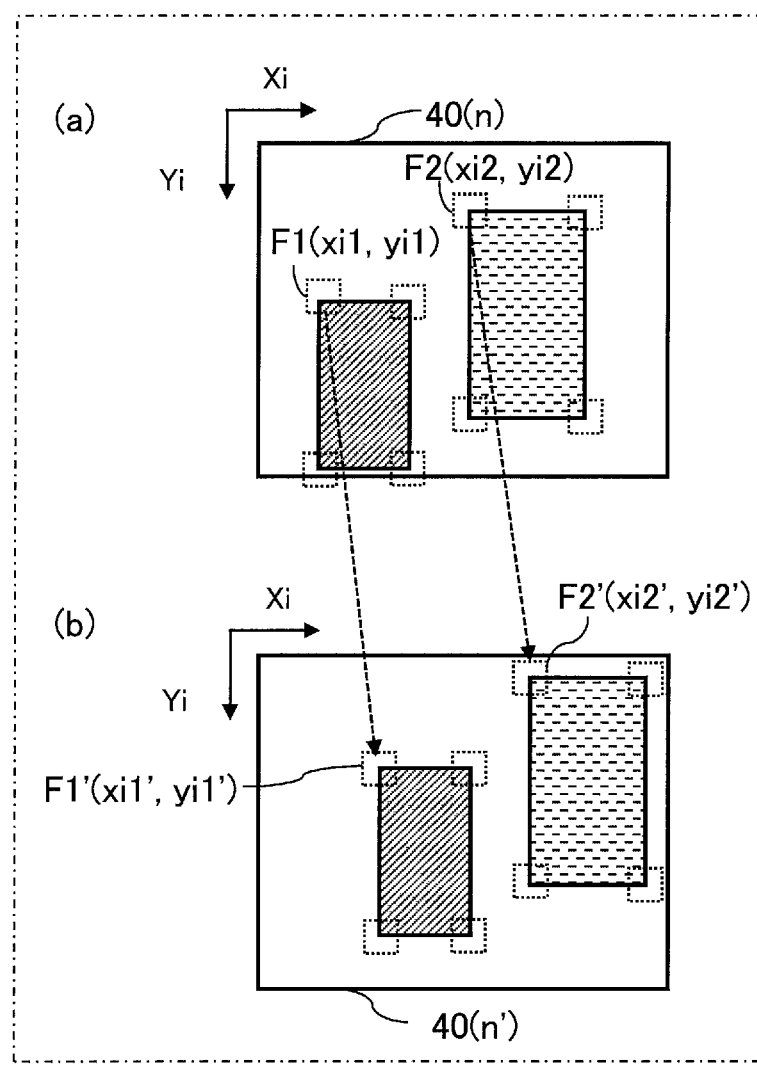
FIG. 10 shows feature points extracted by an image processor 31 of FIG. 3; (a) shows feature points F1 and F2 extracted from an image 40(n) at time moment n; and (b) shows feature points F1' and F2' extracted from an image 40(n') at time moment n'.

FIG. 10 is a diagram showing feature points extracted by the image processor 31 of FIG. 3. FIG. 10(a) shows feature points F1 and F2 extracted from an image 40(n) at time moment n. FIG. 10(b) shows feature points F1' and F2' extracted from an image 40(n') at time moment n'. In the image coordinate system of the image 40(n) of FIG. 10(a), the feature point F1 has coordinates (xi1, yi1), and the feature point F2 has coordinates (xi2, yi2). In the image coordinate system of the image 40(n') of FIG. 10(b), the feature point F1' has coordinates (xi1', yi1'), and the feature point F2' has coordinates (xi2', yi2'). The feature points F1' and F2' of FIG. 10(b) correspond to the feature points F1 and F2 of FIG. 10(a), respectively.

In step S14 of FIG. 9, the image processor 31 obtains pairs of coordinates of the corresponding feature points in the first and second images. For example, the image processor 31 obtains a pair of coordinates (xi1, yi1; xi1', yi1') of the feature points F1 and F1', and a pair of coordinates (xi2, yi2; xi2', yi2') of the feature points F2 and F2'.

In step S15, the relative position calculator 32 calculates a fundamental matrix E having 3×3 elements, based on the coordinates of the feature points obtained in step S14, for example, using a 5-point algorithm.

In step S16, the relative position calculator 32 performs singular value decomposition of the fundamental matrix E to calculate a rotation matrix R and a translation vector t, which represent movement of the vehicle 1 between time moments of capturing the first and second images, respectively. The rotation matrix R indicates a change in the attitude of the vehicle 1 between the time moments of capturing the first and second images, respectively. The translation vector t indicates a change in the position of the vehicle 1 between the time moments of capturing the first and second images, respectively.

For example, calculations of the rotation matrix R and the translation vector t are formulated as follows.

The fundamental matrix E is expressed as $E=U\Sigma V^T$ by performing singular value decomposition. Where E is a diagonal matrix having 3×3 elements, and each of U and V is an orthogonal matrix having 3×3 elements.

The rotation matrix R is calculated as $R=UW^{-1}V^T$, using the following matrix W having 3×3 elements.

$$W = \begin{pmatrix} 0 & -1 & 0 \\ 1 & 0 & 0 \\ 0 & 0 & 1 \end{pmatrix} \quad \text{[Mathematical Expression 1]}$$

In addition, a matrix $T=VW\Sigma V^T$ having 3×3 elements is calculated to obtain the translation vector t. The matrix T satisfies E=TR, and is represented as follows.

$$T = \begin{pmatrix} 0 & -t_z & t_y \\ t_z & 0 & -t_x \\ -t_y & t_x & 0 \end{pmatrix} \quad \text{[Mathematical Expression 2]}$$

The translation vector t is represented as $t=(t_x, t_y, t_z)^T$ using the elements of the matrix T.

In step S17, the relative position calculator 32 calculates and outputs the relative position and the relative attitude of the vehicle 1. When the vehicle 1 has a relative position t(n−1) and a relative attitude R(n−1) at an most recent time moment n−1, a relative position t(n) of the vehicle 1 at the current time moment n is represented as t(n)=t(n−1)+tR(n−1), using the translation vector t calculated in step S16. In addition, a relative attitude R(n) of the vehicle 1 at the current time moment n is represented as R(n)=RR(n−1), using the rotation matrix R calculated in step S16. Thus, the relative position calculator 32 calculates the relative position and the relative attitude of the vehicle 1 with respect to the reference position and the reference attitude, by cumulatively adding a plurality of translation vectors, and cumulatively multiplying a plurality of rotation matrices.

[Absolute Position Calculation Process]

Figure 11:
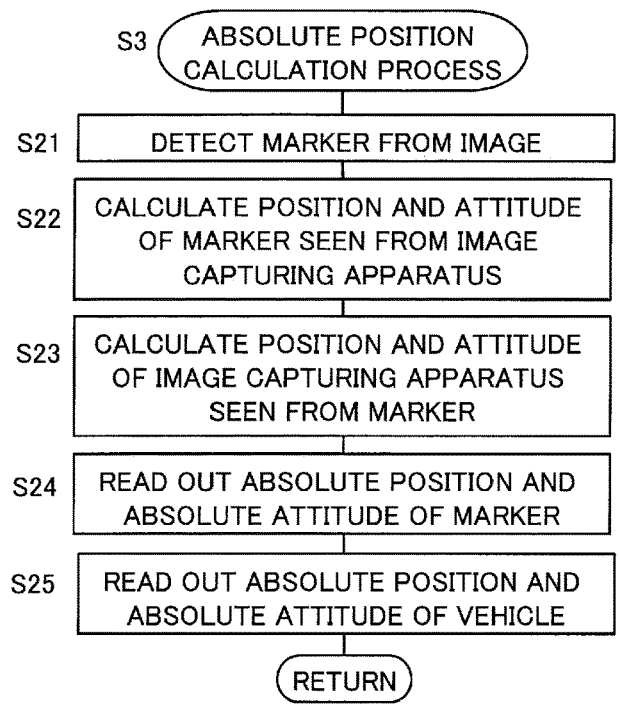
FIG. 11 is a flowchart showing a subroutine of step S3 (absolute position calculation process) of FIG. 8.

FIG. 11 is a flowchart showing a subroutine of step S3 (absolute position calculation process) of FIG. 8.

In step S21, the image recognizer 33 detects the marker 4 from the image.

In this case, the image recognizer 33 detects coordinates of four vertices (corners) of the quadrangular marker 4 in the image coordinate system, and decodes a pattern of the marker 4 to obtain the identifier of the marker 4. The image recognizer 33 may detect coordinates of some predetermined points, instead of the four vertices of the marker 4.

Figure 12:
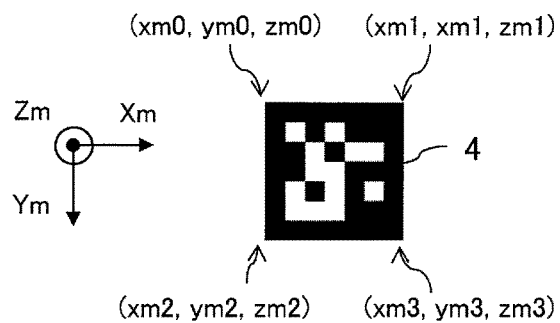
FIG. 12 is a diagram showing coordinates of vertices of the marker 4 in a marker coordinate system.

FIG. 12 is a diagram showing the coordinates of the vertices of the marker 4 in the marker coordinate system. In the marker coordinate system (Xm, Ym, Zm), the four vertices of the marker 4 have coordinates (xm0, ym0, zm0), (xm1, ym1, zm1), (xm2, ym2, zm2), and (xm3, ym3, zm3), respectively. Since the size of the marker 4 is known, the coordinates of the four vertices of the marker 4 in the marker coordinate system are also known. For example, when the upper left vertex of the marker 4 of FIG. 12 is an origin of the marker coordinate system (Xm, Ym, Zm), and the marker 4 has a size of 30 cm×30 cm, the vertices of the marker 4 have coordinates, for example, (xm0, ym0, zm0)=(0, 0, 0), (xm1, ym1, zm1)=(0.3, 0, 0), (xm2, ym2, zm2)=(0, 0.3, 0), and (xm3, ym3, zm3)=(0.3, 0.3, 0).

Figure 13:
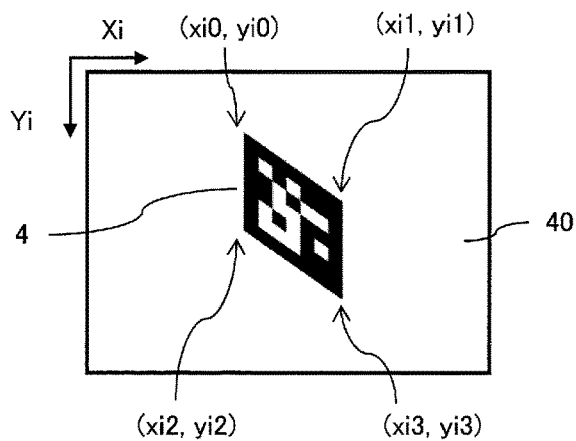
FIG. 13 is a diagram showing coordinates of vertices of the marker 4 in the image 40 captured by the image capturing apparatus 11 of FIG. 1.

FIG. 13 is a diagram showing coordinates of vertices of the marker 4 in the image 40 captured by the image capturing apparatus 11 of FIG. 1. In the image coordinate system (Xi, Yi), the four vertices of the marker 4 have coordinates (xi0, yi0), (xi1, yi1), (xi2, yi2), and (xi3, yi3), respectively.

In step S22 of FIG. 11, the absolute position calculator 34 calculates the position and the attitude of the marker 4 in a three-dimensional coordinate system whose origin is located at the image capturing apparatus 11 (camera coordinate system), based on the coordinates of the marker 4 detected in step S21 (i.e., the position and the attitude of the marker 4 as seen from the image capturing apparatus 11). For example, the absolute position calculator 34 calculates the position and the attitude of the marker 4 as seen from the image capturing apparatus 11, by solving a perspective n point (PnP) problem based on the coordinates of the four vertices of the marker 4 in the two-dimensional image coordinate system, and based on the coordinates of the four vertices of the marker 4 in the three-dimensional marker coordinate system.

In step S23, the absolute position calculator 34 calculates the position and the attitude of the image capturing apparatus 11 in the marker coordinate system (i.e., the position and the attitude of the image capturing apparatus 11 as seen from the marker 4). In this case, the position of the marker 4 as seen from the image capturing apparatus 11 is represented by the translation vector t, and the attitude of the marker 4 as seen from the image capturing apparatus 11 is represented by the rotation matrix R. In this case, the attitude of the image capturing apparatus 11 as seen from the marker 4 is represented by $R^{-1}$, and the position of the image capturing apparatus 11 as seen from the marker 4 is represented by $-R^{-1}t$.

In step S24, the absolute position calculator 34 reads out the position and the attitude of the marker 4 in the world coordinate system (i.e., the absolute position and the absolute attitude of the marker 4) from the storage apparatus 35, based on the identifier of the marker 4 detected in step S21.

The absolute position calculator 34 may execute step S24 before step 22, or may execute step S24 in parallel with step S22.

In step S25, the absolute position calculator 34 calculates the position and the attitude of the vehicle 1 in the world coordinate system (i.e., the absolute position and the absolute attitude of the vehicle 1), based on the position and the attitude of the image capturing apparatus 11 in the marker coordinate system calculated in step S23, and based on the position and the attitude of the marker 4 in the world coordinate system read out in step S24. The position and the attitude of the vehicle 1 in the world coordinate system can be obtained by adding the position and the attitude of the marker 4 in the world coordinate system, as offset values, to the position and the attitude of the image capturing apparatus 11 in the marker coordinate system.

[Correction Process]

Figure 14:
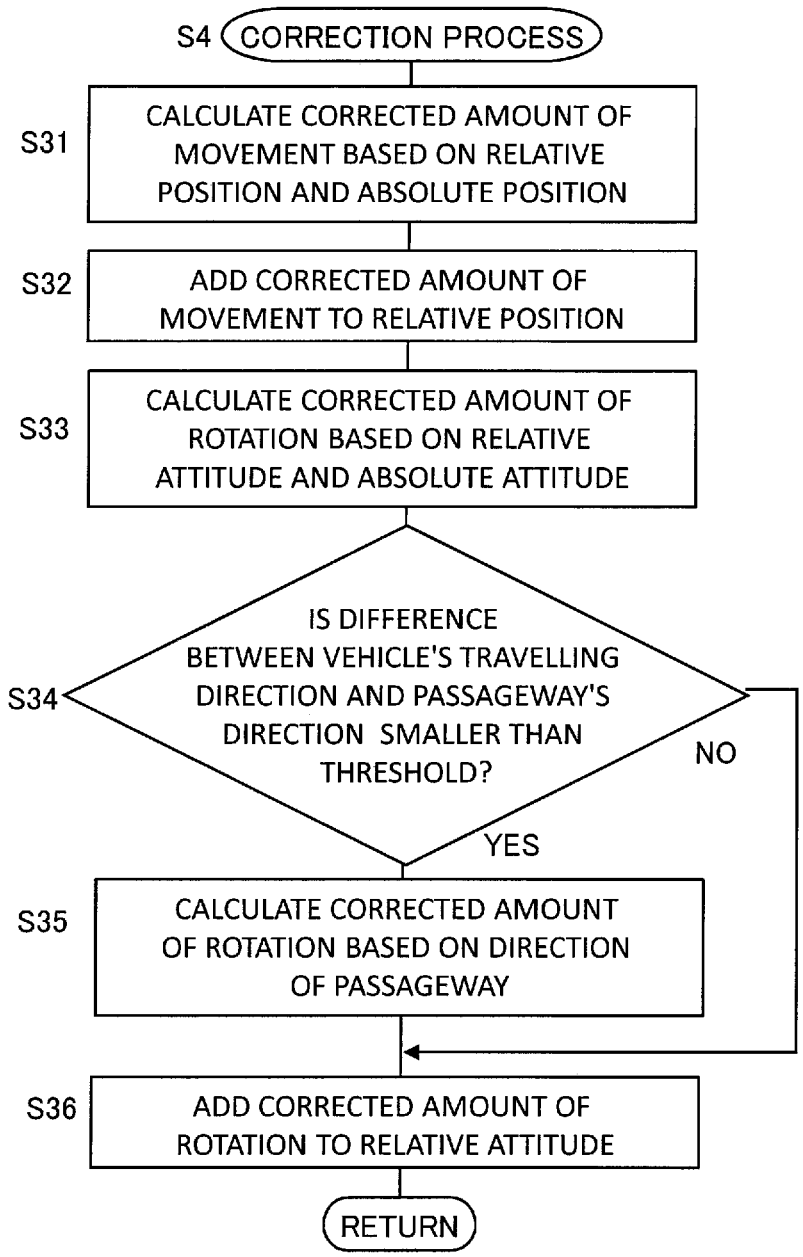
FIG. 14 is a flowchart showing a subroutine of step S4 (correction process) of FIG. 8.

FIG. 14 is a flowchart showing a subroutine of step S4 (correction process) of FIG. 8.

In step S31, the corrector 36 calculates a corrected amount of movement of the vehicle 1 based on the relative position and the absolute position of the vehicle 1.

Figure 15:
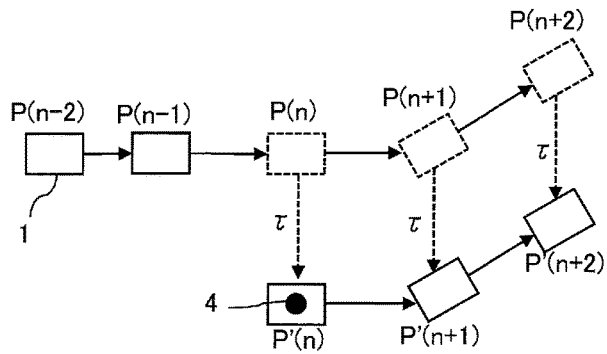
FIG. 15 is a diagram for explaining a corrected amount of movement calculated in step S31 of FIG. 14.

FIG. 15 is a diagram for explaining the corrected amount of movement calculated in step S31 of FIG. 14. FIG. 15 shows a position of the vehicle 1 calculated by the positioning apparatus 12. At time moments n−2 to n+2, the vehicle 1 has relative positions P(n−2) to P(n+2). When the vehicle 1 arrives at the relative position P(n), the positioning apparatus 12 detects the marker 4. At this time, even if the relative position P(n) is remote from the marker 4 on the map, it is considered that the vehicle 1 is actually located near the marker 4. Therefore, the positioning apparatus 12 calculates a difference between the relative position P(n) and the position of the marker 4 as a corrected amount of movement τ. The positioning apparatus 12 adds the corrected amount of movement τ to the relative position P(n) to obtain a corrected position P' (n). Thereafter, the positioning apparatus 12 similarly adds the corrected amount of movement t to the relative positions P(n+1), P(n+2), and so on, to obtain corrected positions P' (n+1), P'(n+2), and so on.

In step S32 of FIG. 14, the corrector 36 adds the corrected amount of movement of the vehicle 1 to the relative position of the vehicle 1.

In step S33, the corrector 36 calculates a corrected amount of rotation of the vehicle 1 based on the relative attitude and the absolute attitude of the vehicle 1.

Figure 16:
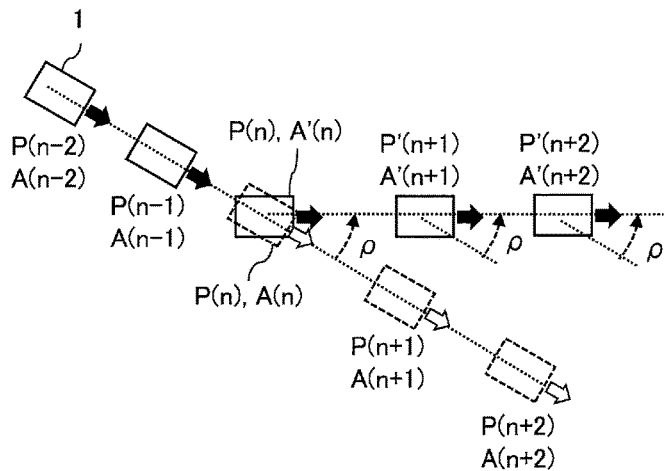
FIG. 16 is a diagram for explaining a corrected amount of rotation calculated in step S33 of FIG. 14.

FIG. 16 is a diagram for explaining the corrected amount of rotation calculated in step S33 of FIG. 14. FIG. 16 shows positions P and P' and attitudes A and A' of the vehicle 1 calculated by the positioning apparatus 12. At the time moments n−2 to n+2, the vehicle 1 has relative positions P(n−2) to P(n+2) and relative attitudes A(n−2) to A(n+2). In FIG. 16, each of thick arrows indicates an attitude of the vehicle 1. When the vehicle 1 arrives at the relative position P(n), the positioning apparatus 12 detects the marker 4, and calculates an absolute attitude of the vehicle 1. The positioning apparatus 12 calculates a difference between the relative attitude A(n) and the absolute attitude, as a corrected amount of rotation ρ, while setting the relative position P(n) at the center of rotation. The positioning apparatus 12 adds the corrected amount of rotation ρ to the relative attitude A(n) to obtain a corrected attitude A' (n). Thereafter, the positioning apparatus 12 similarly adds the corrected amount of rotation ρ to the relative attitudes A(n+1), A(n+2), and so on, to obtain corrected attitudes A' (n+1), A'(n+2), and so on.

In step S33, the corrector 36 may calculate, as the corrected amount of rotation of the vehicle 1, a difference between the absolute attitude and an average of a plurality of relative attitudes calculated over a predetermined time length (or in correspondence with a predetermined number of consecutive images). It is difficult to determine the actual traveling direction of the vehicle 1 (for example, whether or not the vehicle 1 is travelling along the passageway 101), based on only an instantaneous value of the relative attitude of the vehicle 1. In addition, the relative attitude of the vehicle 1 may include an error. Accordingly, it is possible to accurately determine the actual traveling direction of the vehicle 1 using the average of the plurality of relative attitudes.

If the absolute position and the absolute attitude are accurately calculated, it is possible to accurately calculate the position and the attitude of the vehicle 1. However, as described above, a disposition error may occur in the attitude of the marker 4 itself, and a calculation error may occur when calculating the absolute position and the absolute attitude.

Figure 17:
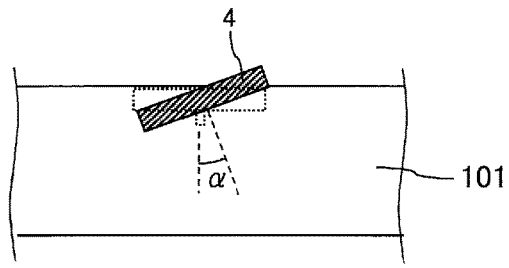
FIG. 17 is a diagram for explaining an error in an attitude of the marker 4 of FIG. 4, the error being produced when disposing the marker 4 (disposition error).

FIG. 17 is a diagram for explaining an error in the attitude of the marker 4 of FIG. 4, the error being produced when disposing the marker 4 (disposition error). As shown in FIG. 17, when disposing the marker 4, a disposition error may occur in the attitude of the marker 4 itself. For example, when the marker 4 is disposed on a wall of the passageway 101 having a width of 3 m, with a disposition error of $\alpha=5$ degrees, the relative position of the vehicle 1 having travelled 35 m along the passageway 101 varies by 35 m×sin(5 degrees)=3.05 m, thus protruding from the passageway 101 in a lateral direction.

Figure 18:
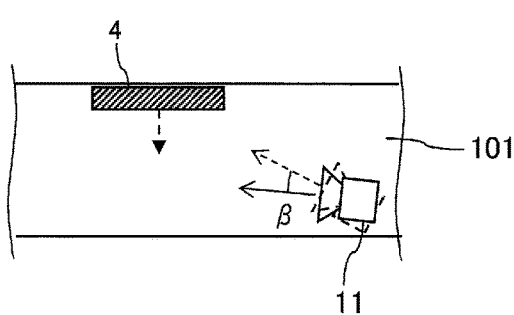
FIG. 18 is a diagram for explaining an error in an attitude of the image capturing apparatus 11, the error being produced when calculating the attitude of the marker 4 in step S3 (absolute position calculation process) of FIG. 8 (calculation error).

FIG. 18 is a diagram for explaining an error in an attitude of the image capturing apparatus 11, the error being produced when calculating the attitude of the marker 4 in step S3 (absolute position calculation process) of FIG. 8 (calculation error). As shown in FIG. 18, a calculation error may occur in the position or the attitude of the image capturing apparatus 11 as seen from the marker 4, when calculating the absolute position and the absolute attitude. Similarly, a calculation error may occur in the position or the attitude of the marker 4 as seen from the image capturing apparatus 11, when calculating the absolute position and the absolute attitude.

As described above, the directions, sizes, and arrangements of the passageways 101 are stored in the storage apparatus 35 as a part of the map information. Therefore, the positioning apparatus 12 corrects the relative attitude of the vehicle 1 based on the direction of the passageway 101, instead of the absolute value of the vehicle 1, when it is determined that the vehicle 1 is travelling along the passageway 101. Thus, even when a disposition error occurs in the attitude of the marker 4 itself, and even when a calculation error occurs when calculating the absolute position and the absolute attitude, it is possible to reduce effects of these errors.

In step S34 of FIG. 14, the corrector 36 determines whether or not the marker 4 used for calculating the absolute position and the absolute attitude is disposed along the passageway 101, and if YES, then determines whether or not an angular difference between the traveling direction of the vehicle 1 having the corrected position and the corrected attitude, and the direction of the passageway 101 is smaller than a predetermined threshold: if YES, the process proceeds to step S35; if NO, the process proceeds to step S36. In other words, in step S34, the corrector 36 determines whether or not the angular difference between the direction of the absolute attitude of the vehicle 1, and the direction of the passageway 101 is smaller than the threshold.

The threshold of step S34 may be set, for example, in consideration of both the disposition error and the calculation error. For example, assume that the markers 4 disposed in the warehouse 100 have an averaged disposition error of 5 degrees, and an averaged calculation error of 6 degrees occurs when calculating the attitude of the vehicle 1 based on images of a plurality of the markers 4 captured from various positions at distances of 10 m or shorter. In this case, the threshold may be set to, for example, 5+6=11 degrees.

In step S34 of FIG. 14, the traveling direction of the vehicle 1 may be represented by the absolute attitude calculated based on the marker 4, as described above. Alternatively, the traveling direction of the vehicle 1 may be represented by a direction of a vector indicating the most recent movement of the vehicle 1 having the corrected position. The "most recent movement" means movement from a time moment preceding by a predetermined time length, to a current time moment, or movement from an image preceding by a predetermined number of images, to a current image. For example, as shown in FIG. 16, when the vehicle 1 has corrected positions P' (n) to P' (n+1) at time moments n to n+1, the traveling direction of the vehicle 1 at the time moment n+1 is represented by a direction of a vector from the position P'(n) to the position P'(n+1). In this case, step S33 of FIG. 14 may be executed when NO in step S34, instead of before step S34. Thus, it is possible to reduce the calculation amount of the corrector 36.

In addition, in step S34, the corrector 36 may calculate a direction of a vector indicating the most recent movement of the vehicle 1 having the corrected position, over a predetermined time length, or in correspondence with a predetermined number of consecutive images. In this case, the traveling direction of the vehicle 1 may be represented by an average of directions of a plurality of vectors. It is possible to accurately determine the actual traveling direction of the vehicle 1 using the average of the plurality of vectors.

In step S35, the corrector 36 calculates a corrected amount of rotation of the vehicle 1 based on the direction of the passageway 101, instead of the absolute attitude.

Figure 19:
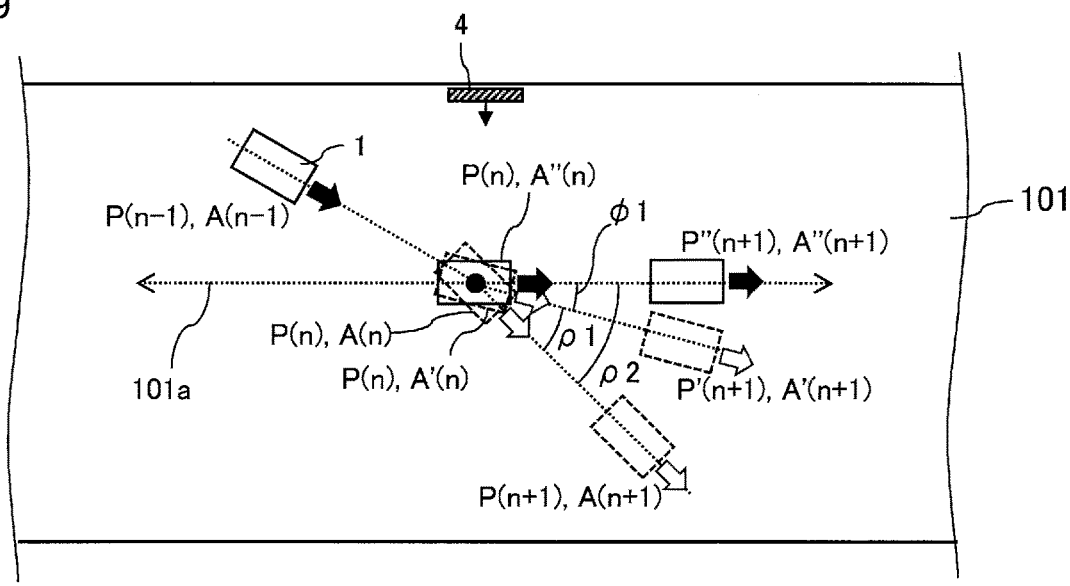
FIG. 19 is a diagram for explaining a correction process when a difference between a traveling direction of the vehicle 1 and a direction of the passageway 101 is smaller than a threshold in step S34 of FIG. 14.

FIG. 19 is a diagram for explaining a correction process performed when the difference between the traveling direction of the vehicle 1 and the direction of the passageway 101 is smaller than the threshold in step S34 of FIG. 14. FIG. 19 shows positions P, P', and P", and attitudes A, A', and A" of the vehicle 1 calculated by the positioning apparatus 12. At time moments n−1 to n+1, the vehicle 1 has relative positions P(n−1) to P(n+1) and relative attitudes A(n−1) to A(n+1). When the vehicle 1 arrives at the relative position P(n), the positioning apparatus 12 detects the marker 4, and calculates an absolute attitude of the vehicle 1. The corrector 36 calculates a difference between the relative attitude A(n) and the absolute attitude, as a corrected amount of rotation $\rho 1$, while setting the relative position P(n) at the center of rotation. When the corrected amount of rotation $\rho 1$ is added to the relative attitude A(n), an attitude A' (n) corrected based on the absolute attitude (marker 4) is obtained. In this case, when an angular difference $\phi 1$ between the traveling direction of the vehicle 1 having the corrected attitude A' (n), and a direction 101a of the passageway 101 is smaller than the predetermined threshold, it is considered that the vehicle 1 is actually travelling along the passageway 101. Therefore, in this case, the corrector 36 calculates a corrected amount of rotation $\rho 2$ of the vehicle 1 based on the direction 101a of the passageway 101. The corrector 36 adds the corrected amount of rotation ρ2 to the relative attitude A(n) to obtain an attitude A″ (n) corrected based on the direction of the passageway 101.

Figure 20:
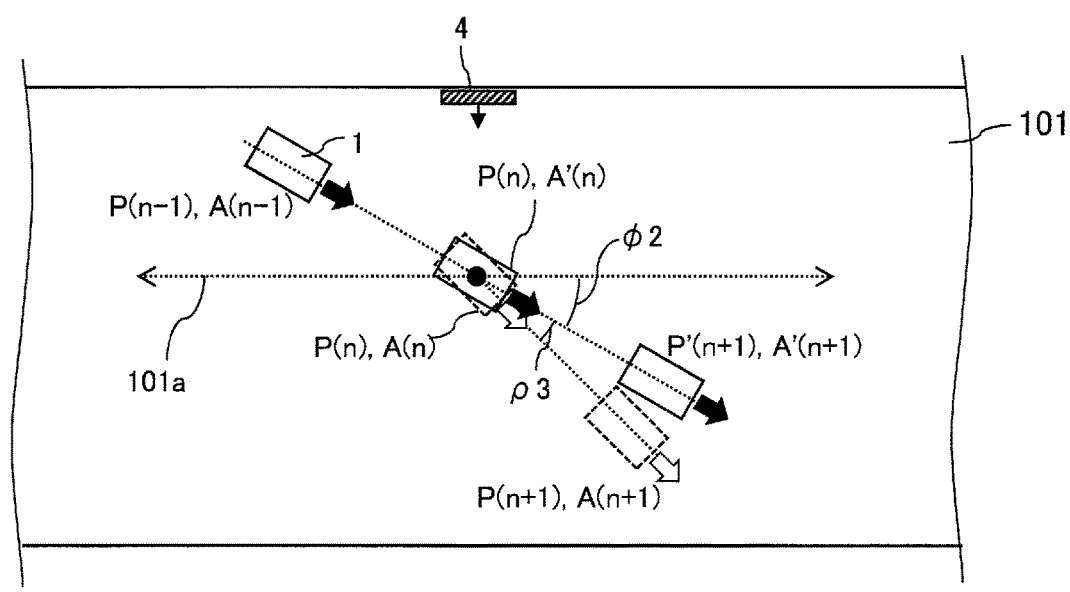
FIG. 20 is a diagram for explaining a correction process when a difference between the traveling direction of the vehicle 1 and the direction of the passageway 101 is equal to or larger than the threshold in step S34 of FIG. 14.

FIG. 20 is a diagram for explaining a correction process performed when the difference between the traveling direction of the vehicle 1 and the direction of the passageway 101 is equal to or more than the threshold in step S34 of FIG. 14. When the vehicle 1 arrives at the relative position P(n), the positioning apparatus 12 detects the marker 4, and calculates an absolute attitude of the vehicle 1. The corrector 36 calculates a difference between the relative attitude A(n) and the absolute attitude, as a corrected amount of rotation ρ3, while setting the relative position P(n) at the center of rotation. When the corrected amount of rotation ρ3 is added to the relative attitude A(n), the attitude A' (n) corrected based on the absolute attitude (marker 4) is obtained. In this case, when an angular difference φ2 between the traveling direction of the vehicle 1 having the corrected attitude A' (n), and the direction 101a of the passageway 101 is equal to or larger than the predetermined threshold, it is considered that the vehicle 1 is not travelling along the direction 101a of the passageway 101. Therefore, in this case, the corrector 36 does not calculate a corrected amount of rotation based on the direction 101a of the passageway 101.

In step S36 of FIG. 14, the corrector 36 adds the corrected amount of rotation of the vehicle 1 to the relative attitude of the vehicle 1. If YES in step S34, the corrector 36 calculates an attitude corrected based on the direction of the passageway 101, using the corrected amount of rotation calculated based on the direction 101a of the passageway 101 in step S35. On the other hand, if NO in step S34, the corrector 36 calculates an attitude corrected based on the absolute attitude (marker 4), using the corrected amount of rotation calculated based on the absolute attitude (marker 4) in step S33.

Figure 21:
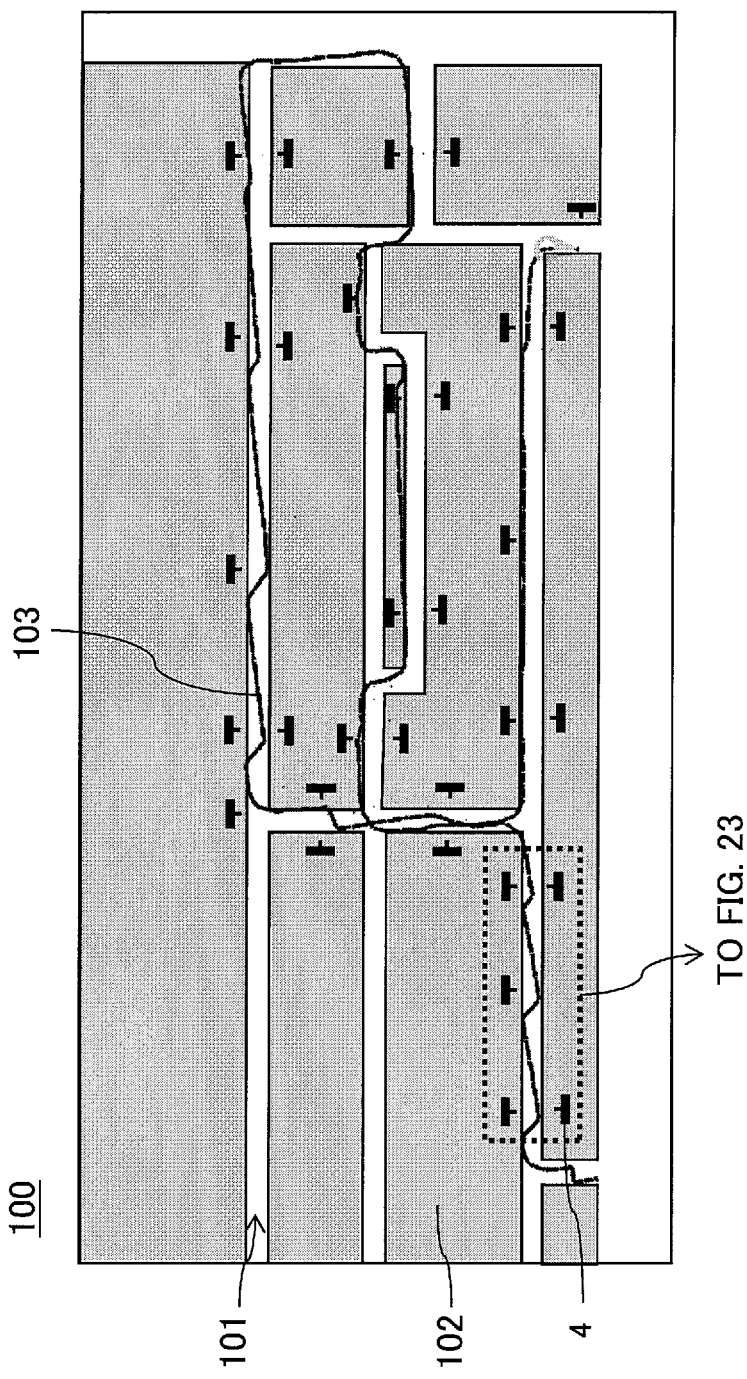
FIG. 21 is a diagram showing a trajectory 103 of the vehicle 1 calculated by executing a correction process according to a comparison example of the first embodiment.
Figure 22:
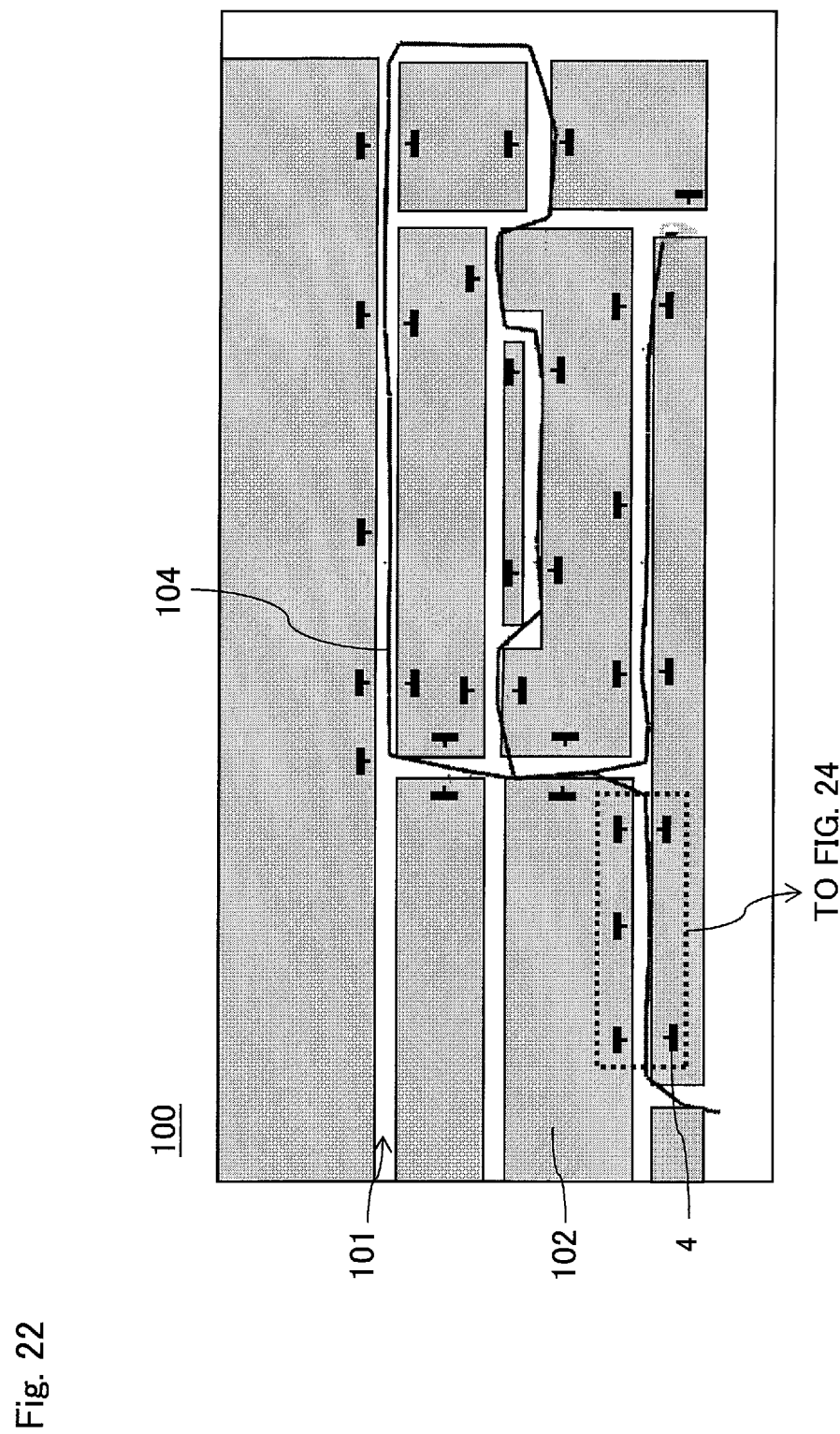
FIG. 22 is a diagram showing a trajectory 104 of the vehicle 1 calculated by executing the correction process of FIG. 14.
Figure 23:
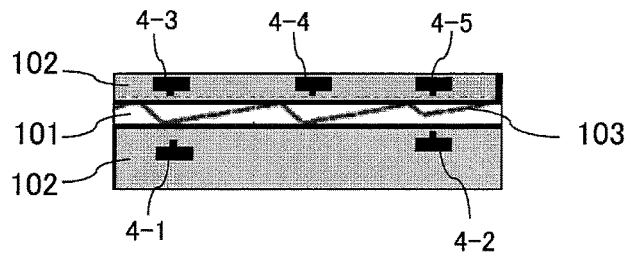
FIG. 23 is an enlarged diagram of a region surrounded by a broken line in FIG. 21.
Figure 24:
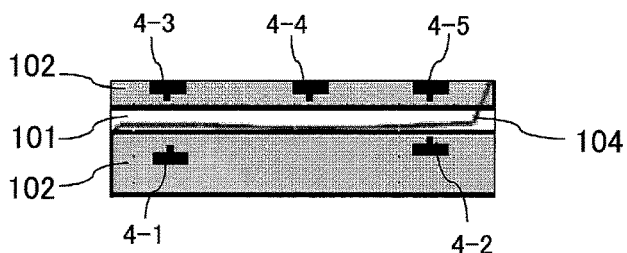
FIG. 24 is an enlarged diagram of a region surrounded by a broken line in FIG. 22.

FIG. 21 is a diagram showing a trajectory 103 of the vehicle 1 calculated by executing a correction process according to a comparison example of the first embodiment. FIG. 22 is a diagram showing a trajectory 104 of the vehicle 1 calculated by executing the correction process of FIG. 14. FIG. 23 is an enlarged diagram of a region surrounded by a broken line in FIG. 21. FIG. 24 is an enlarged diagram of a region surrounded by a broken line in FIG. 22. Each of FIGS. 21 to 24 shows a protrusion provided on one side of each of the markers 4 to indicate a front surface of the marker 4 (Zm axis in FIG. 5) for convenience of explanation. Actually, such protrusion is not provided. FIG. 21 shows a case where steps S34 to S35 of FIG. 14 are not executed. According to FIG. 21, the calculated trajectory 103 of the vehicle 1 meanders and protrudes from the passageway 101, due to an error in the attitude of the marker 4 itself, and/or an error occurring when calculating the absolute position and the absolute attitude. On the other hand, according to FIG. 22, it is possible to reduce effects of the errors by correcting the relative attitude of the vehicle 1 based on the direction of the passageway 101, and also reducing meandering and protrusion in the calculated trajectory 104 of the vehicle 1.

Referring to FIGS. 23 and 24, the trajectory 104 goes more straight along the passageway 101 than the trajectory 103. Accordingly, it is considered that, for example, a marker 4-4 may be omitted. Thus, it is possible to reduce costs of the positioning system by reducing the number of markers 4.

According to the first embodiment, the relative position and the relative attitude calculated from the feature points 41 using Visual-SLAM or the like are corrected based on the absolute position and absolute attitude calculated from the markers 4, and therefore, it is possible to accurately measure the position and the attitude of the vehicle 1. In addition, according to the first embodiment, when correcting the relative position and the relative attitude based on the absolute position and the absolute attitude, the relative attitude of the vehicle 1 is corrected based on the direction of the passageway 101, and therefore, it is possible to reduce an effect of an error in the absolute attitude, and more accurately measure the position and the attitude of the vehicle 1.

According to the first embodiment, it is possible to measure the position of the vehicle 1 at a low cost using the image capturing apparatus 11, even in an indoor place where radio waves from GPS satellites can not be received, such as a warehouse or a factory. Since it is not necessary to dispose a large number of wireless transmitters for transmitting wireless signals, initial costs can be reduced.

According to the first embodiment, it is possible to improve work based on the travelling path of the vehicle 1 obtained from positioning results.

According to the first embodiment, it can be utilized for determining the necessity of maintenance, the necessity of renewal of lease contracts, and the like, based on the travelled distance of the vehicle 1.

According to the first embodiment, it is possible to optimize a layout of passageways, shelves, and the like in a warehouse or a factory, based on a heat map of movement of the vehicle 1.

According to the first embodiment, it is possible to visualize a place where the vehicles 1 passes by each other during movement, based on differences among trajectories of the vehicles 1, and therefore, improve paths and width of passageways to improve safety.

Modified Embodiment of First Embodiment

According to the example of FIG. 14 described above, the calculation of the corrected amount of rotation (step S33) is always executed. However, when the marker 4 is consecutively detected in a plurality of images, and the absolute position of the vehicle 1 can be consecutively calculated based on the respective markers in the plurality of images, the traveling direction (i.e., attitude) of the vehicle 1 can be determined from these absolute positions, and therefore, it is not necessary to calculate a corrected amount of rotation. Therefore, when the marker 4 is consecutively detected in a plurality of images, the corrector 36 may skip steps S33 to S35 of FIG. 14. In this case, in step S36, the corrector 36 adds a latest corrected amount of rotation previously calculated and stored therein, to the relative attitude of the vehicle 1. The phrase "consecutively detecting" means that, for example, when a marker 4 having a certain identifier (for example, ID: 010) is detected at a certain time moment n, the marker 4 having the same identifier is detected within a predetermined threshold time (for example, one second). The corrector 36 determines that the marker 4 is consecutively detected when the absolute position and the absolute attitude are consecutively inputted from the absolute position calculator 34.

On the other hand, the marker 4 does not necessarily exist in a visual field of the image capturing apparatus 11 when the vehicle 1 is travelling, and therefore, the marker 4 may not be detected. When a marker 4 having a certain identifier is detected, and the marker 4 having the same identifier is not detected within the threshold time, the corrector 36 stores therein the absolute position and the absolute attitude corresponding to the most recently detected marker 4. Thereafter, while the marker 4 is not detected, the corrector 36 calculates the corrected amount of movement and the corrected amount of rotation of the vehicle 1, based on the relative position and the relative attitude consecutively inputted from the relative position calculator 32, and based on the latest absolute position and the latest absolute attitude stored therein (corresponding to the marker 4 most recently detected).

In the example described above, the corrector 36 manages the absolute position and the absolute attitude separately from the relative position and the relative attitude, without replacing the relative position and the relative attitude with the absolute position and the absolute attitude. Alternatively, the corrector 36 may replace the relative position and the relative attitude with the absolute position and the absolute attitude, and then, calculate the relative position and the relative attitude using the absolute position and the absolute attitude as a new reference position and a new reference attitude.

The image capturing apparatus 11 may be configured to generate an image of an object, and also detect distances from the image capturing apparatus 11 to points of the object. The image capturing apparatus 11 may include a depth sensor, such as an RGB-D camera, or a Time of Flight (ToF) sensor, in order to detect a distance to the object. Alternatively, the image capturing apparatus 11 may be a stereo camera including two cameras disposed apart from each other by a certain distance, in order to detect a distance to the object.

When the image capturing apparatus 11 detects the distance, the relative position calculator 32 may calculate the relative position and the relative attitude of the vehicle 1 using a well-known iterative closest point (ICP) algorithm or the like.

While the relative position calculation process of FIG. 9 using FAST and KLT trackers is described by way of example, other methods may be used. For example, feature point detection, feature point matching, or the like, using Scale Invariant Feature Transform (SIFT) or Oriented FAST and Rotated BRIEF (ORB), which are typically used for image processing, may be used.

While each of the passageways 101 in FIG. 4 and others includes only a straight section, at least a part of the passageway 101 may include a curved section. When detecting the marker 4 provided in the curved section of the passageway 101, the positioning apparatus 12 can correct the relative attitude of the vehicle 1 based on the direction of the passageway 101 near the marker 4, in a manner similar to the example described with reference to FIGS. 19 and 20, etc.

When the marker 4 is disposed at the middle of the straight section of the passageway 101, it is expected that the absolute position and the absolute attitude can be calculated accurately. On the other hand, when the marker 4 is disposed near an intersection of the passageways 101, or near an entrance and exit of the passageways 101, the vehicle 1 does not always go straightforward near the marker 4, and therefore, errors may increase in the absolute position and the absolute attitude calculated. Therefore, some of the plurality of markers 4 may be provided as an auxiliary marker not used for calculating the absolute position and the absolute attitude (i.e., for correcting the position and the attitude). The auxiliary marker is disposed near, for example, origination or destination of the vehicle 1, or certain structures which may be other checkpoints (an entrance and exit of the warehouse 100, an intersection of the passageways 101, a specific one of the shelves 102, and the like). The auxiliary marker need not be disposed along the passageway 101, as long as the auxiliary marker can be captured from the vehicle 1. The positioning apparatus 12 can recognize that the vehicle 1 has arrived at a specific checkpoint, by detecting the auxiliary marker. In this case, a marker information table stored in the storage apparatus 35 further includes an item indicating whether or not each of the markers 4 is an auxiliary marker. In addition, in this case, the marker information table may not include information on the position and the attitude of the auxiliary marker. In addition, the marker information table may include an item indicating reliability of the absolute position and the absolute attitude calculated based on each of the markers 4, instead of the item indicating whether or not the marker 4 is an auxiliary marker.

The vehicle 1 and the server apparatus 2 may use a removable storage medium, such as an SD card, instead of the communication apparatuses 13 and 22. The position and the attitude of the vehicle calculated at the vehicle may be written to the storage medium, and the server apparatus 2 may read out the position and the attitude of the vehicle from the storage medium.

The vehicle 1 may be an unmanned cargo carrying apparatus, such as an automated guided vehicle (AGV) and a pallet transport robot. In this case, the vehicle 1 travels by controlling the drive mechanism 15 under control of the server apparatus 2.

Advantageous Effects, Etc. of First Embodiment

According to the first embodiment, the positioning apparatus 12 is provided with the first calculator, the storage apparatus 35, the second calculator, and the corrector 36. The first calculator calculates a first position and a first attitude of the vehicle 1 indicating a relative position and a relative attitude of the vehicle 1 with respect to a reference position and a reference attitude, based on a plurality of images captured by the image capturing apparatus 11 mounted on the vehicle 1. The storage apparatus 35 stores information on identifiers, positions, and attitudes of the plurality of markers 4 disposed at predetermined positions and visually distinguishable from each other, and information on the map including the passageways 101 for the vehicle 1. The second calculator extracts one of the plurality of markers 4 from the images captured by the image capturing apparatus 11, and calculates a second position and a second attitude of the vehicle 1 indicating the position and the attitude of the vehicle 1 in the map, based on the position and the attitude of the one extracted marker 4. The corrector 36 corrects the first position and the first attitude based on the second position and the second attitude to generate the corrected position and the corrected attitude of the vehicle 1. When the one extracted marker 4 is disposed along the passageway 101, and an angular difference between a traveling direction of the vehicle 1 having the corrected position and the corrected attitude, and the direction of the passageway 101 is smaller than a predetermined threshold, the corrector 36 corrects the first attitude based on the direction of the passageway 101, instead of the second attitude.

Thus, it is possible to accurately measure the position and the attitude of the vehicle 1, by correcting the relative position and the relative attitude calculated from on the feature points 41 using Visual-SLAM or the like, based on the absolute position and the absolute attitude calculated from on the marker 4. In addition, when correcting the relative position and the relative attitude based on the absolute position and the absolute attitude, it is possible to reduce an effect of an error in the absolute attitude by correcting the relative attitude of the vehicle 1 based on the direction of the passageway 101, and thus, more accurately measure the position and the attitude of the vehicle 1.

According to the first embodiment, when the angular difference between the direction of the second attitude and the direction of the passageway 101 is smaller than the threshold, the corrector 36 may correct the first attitude based on the direction of the passageway 101, instead of the second attitude.

Thus, the corrector 36 can use the absolute attitude of the vehicle 1 as the traveling direction of the vehicle 1, and determine whether or not the vehicle 1 is travelling along the passageway 101,
based on the absolute attitude of the vehicle 1.

According to the first embodiment, when an angular difference between a direction of a vector indicating the most recent movement of the vehicle 1 having the corrected position, and the direction of the passageway 101 is smaller than a threshold, the corrector 36 may correct the first attitude based on the direction of the passageway 101, instead of the second attitude.

Thus, the corrector 36 can use the vector calculated from the position of the vehicle 1, as the traveling direction of the vehicle 1, instead of using the attitude of the vehicle 1. By using such a vector, it is possible to accurately represent the traveling direction of the vehicle 1, such as a truck, when the vehicle 1 can not turn rapidly in a short time. The corrector 36 can accurately determine whether or not the vehicle 1 is travelling along the passageway 101, based on such a vector.

According to the first embodiment, the corrector 36 may calculate directions of vectors indicating most recent movements of the vehicle 1 having the corrected position, over a predetermined time length, or in correspondence with a predetermined number of consecutive images. In this case, when an angular difference between an average of the directions of the plurality of vectors, and the direction of the passageway 101 is smaller than the threshold, the corrector 36 may correct the first attitude based on the direction of the passageway 101, instead of the second attitude.

Thus, the corrector 36 can use the average of the plurality of vectors calculated from the position of the vehicle 1, as the traveling direction of the vehicle 1. By using the average of the vectors, it is possible to reduce effects of errors in the individual vectors. The corrector 36 can accurately and stably determine whether or not the vehicle 1 is travelling along the passageway 101, based on the average of the vectors.

According to the first embodiment, the corrector 36 may correct an average of a plurality of relative attitudes based on the absolute attitude or the direction of the passageway 101, the plurality of relative attitudes being calculated over a predetermined time length, or in correspondence with a predetermined number of consecutive images.

Thus, the corrector 36 can reduce the effects of the errors in the individual relative attitudes by using the average of the relative attitudes, and thus, more accurately and stably measure the position and the attitude of the vehicle 1.

According to the first embodiment, the vehicle 1 provided with the image capturing apparatus 11 and the positioning apparatus 12 may be provided.

Second Embodiment

With reference to FIGS. 25 to 33, a positioning apparatus according to a second embodiment, and a moving body provided with such a positioning apparatus will be described As described above, the corrector 36 corrects the relative position and the relative attitude calculated from the feature points 41 using Visual-SLAM or the like, based on the absolute position and the absolute attitude calculated from the marker 4. However, when contents of images captured by the image capturing apparatus 11 mounted on the vehicle 1 are rapidly changing, it is considered that errors increase in the relative position and the relative attitude, and also in the absolute position and the absolute attitude. For example, when the vehicle 1 is passing through a corner of a passageway, it is considered that these errors increase as compared with a case where the vehicle 1 is travelling through a straight section of a passageway. In addition, it is considered that errors in the position and the attitude of the vehicle 1 calculated by the positioning apparatus 12, particularly, the relative attitude and the absolute attitude are likely to be affected.

Therefore, according to a positioning apparatus 12 of the second embodiment, the corrector 36 determines whether or not a vehicle 1 is turning, and generates a corrected attitude not using an absolute attitude calculated during a period in which the vehicle 1 is turning, but using only an absolute attitude calculated during a period in which the vehicle 1 is not turning. When a relative attitude possibly including an error is corrected based on an absolute attitude possibly including an error, reliability of the corrected attitude further degrades. According to the second embodiment, the accuracy of the position and the attitude of the vehicle 1 is less likely to degrade, by not using the absolute attitude calculated during the period in which the vehicle 1 is turning, for correction.

In the present disclosure, the phrase "the vehicle 1 is turning" means that a rotation angle (or a variance of the rotation angles) or an angular velocity around a yaw axis of the vehicle 1 is larger than a predetermined threshold. In this case, the yaw axis indicates an axis perpendicular to a floor surface (i.e., Zw axis of FIG. 4) as described above. The rotation angle around the yaw axis of the vehicle 1 is defined as an angle formed between the longitudinal direction of the vehicle 1 and a traveling direction of the vehicle 1 (i.e., defined in a coordinate system of the vehicle 1). In addition, the angular velocity around the yaw axis of the vehicle 1 is defined as an angular velocity of the vehicle 1 with respect to the floor surface (i.e., defined in a stationary coordinate system). In order to generate a corrected attitude, the corrector 36 may not only use an absolute attitude calculated in a period in which the vehicle 1 travels straightforward, but also use an absolute attitude calculated in a period in which the vehicle 1 is turning at a rotation angle or an angular velocity smaller than the threshold.

[Configuration of Second Embodiment]

The positioning apparatus 12 according to the second embodiment is configured in a manner similar to that of the positioning apparatus 12 according to the first embodiment. In the second embodiment, a correction process executed by the positioning apparatus 12 is different from that of the first embodiment.

[Operation of Second Embodiment]

Figure 25:
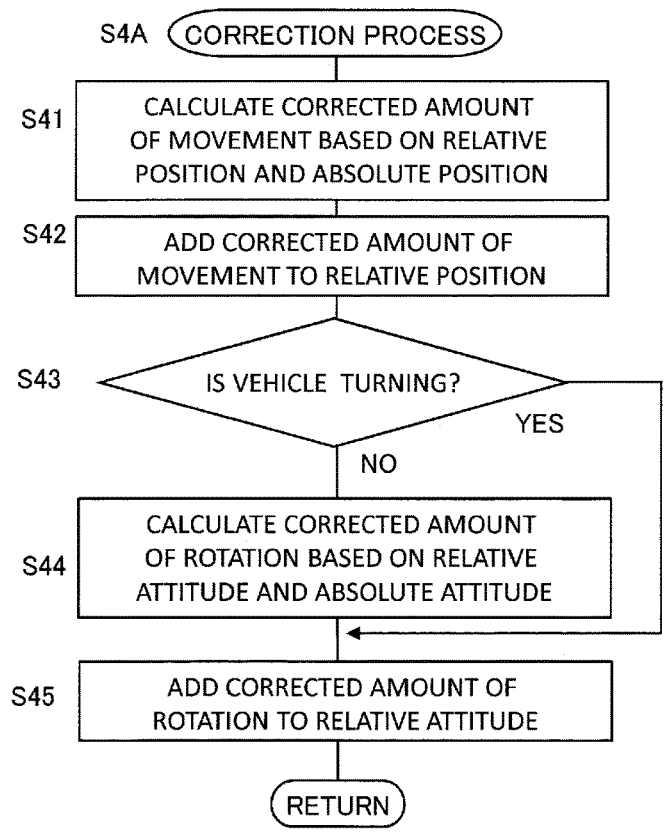
FIG. 25 is a flowchart showing a correction process executed by a positioning apparatus 12 according to a second embodiment.

FIG. 25 is a flowchart showing the correction process executed by the positioning apparatus 12 according to the second embodiment. Step S4A of the correction process of FIG. 25 is executed instead of step S4 of the correction process of FIG. 8.

When performing the correction process of FIG. 25, the corrector 36 at its initial state stores therein a latest corrected amount of movement and a latest corrected amount of rotation, which have been previously calculated.

In step S41, the corrector 36 calculates a corrected amount of movement of the vehicle 1 based on the relative position and the absolute position of the vehicle 1. In step S42, the corrector 36 adds the corrected amount of movement of the vehicle 1 to the relative position of the vehicle 1. Steps S41 to S42 of FIG. 25 are similar to steps S31 to S32 of FIG. 14 according to the first embodiment.

In step S43, the corrector 36 determines whether or not the vehicle 1 is turning: if YES, the process proceeds to step S45; if NO, the process proceeds to step S44.

Figure 26:
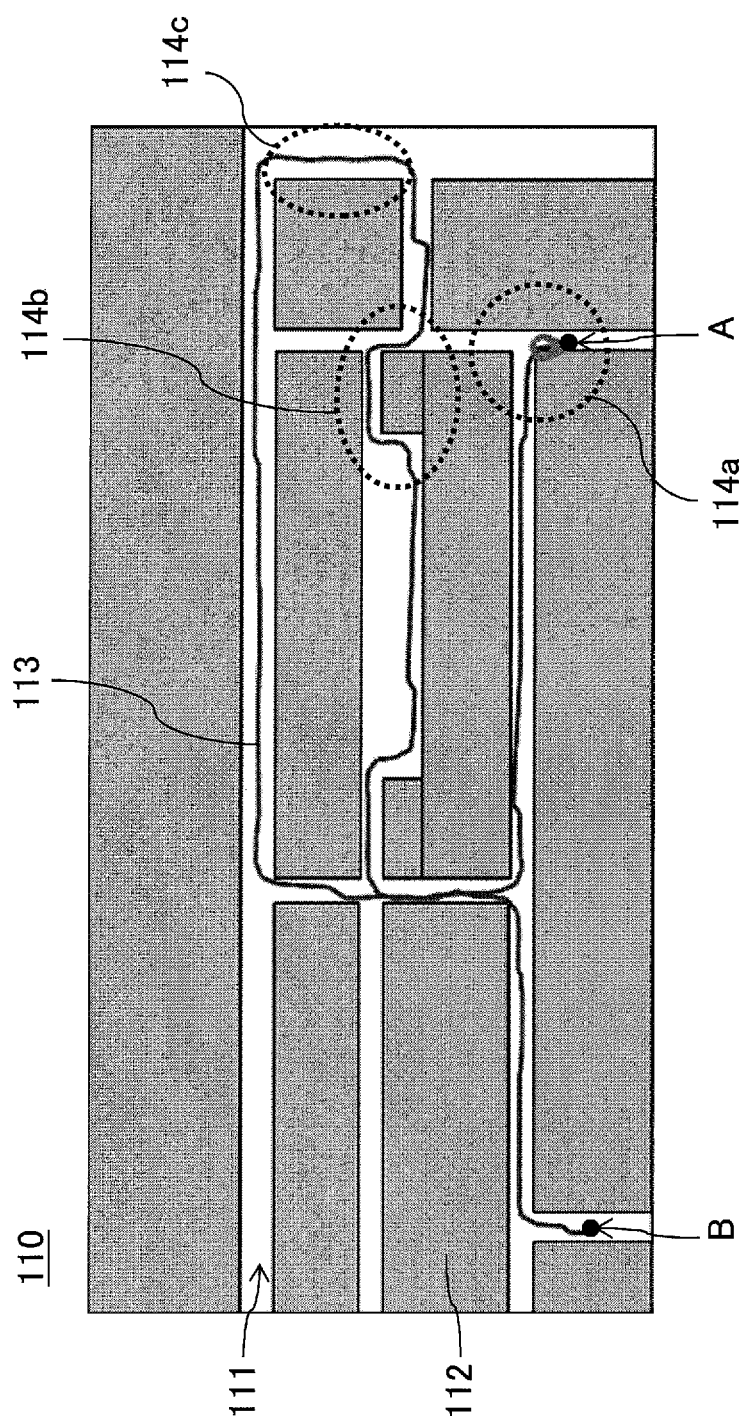
FIG. 26 is a map of a warehouse 110 including passageways 111 through which a vehicle 1 provided with the positioning apparatus 12 according to the second embodiment travels.

FIG. 26 is a map of a warehouse 110 including passageways 111 through which the vehicle 1 provided with the positioning apparatus 12 of the second embodiment travels. The warehouse 110 includes structures, such as a plurality of the passageways 111 and a plurality of shelves 112. In FIG. 26, the markers 4 are not omitted for ease of illustration. FIG. 26 shows a trajectory 113 from a point A to a point B, in which the vehicle 1 has actually travelled. For example, when the vehicle 1 is passing through a corner of the passageways 111, the direction of the vehicle 1 rapidly changes, i.e., the vehicle 1 is turning. In addition, for example, when the vehicle 1 is loading or unloading cargo 3 to or from one of the shelves 112, the vehicle 1 repeats right turn, left turn, forward movement, and backward movement, and therefore, the direction of the vehicle 1 rapidly changes, i.e., the vehicle 1 is turning.

The corrector 36 may determine whether or not the vehicle 1 is turning, for example, based on a change in the relative attitude. The corrector 36 may calculate a rotation angle around the yaw axis of the vehicle 1, or a variance of the rotation angles, based on the change in the relative attitude, and when the calculated value of the rotation angle or the variance of the rotation angles is larger than a predetermined threshold, the corrector 36 may determine that the vehicle 1 is turning. The rotation angle around the yaw axis of the vehicle 1 can be obtained by, for example, extracting feature points from a plurality of images captured by an image capturing apparatus 11, associating the extracted feature points among the images, and calculating a relative attitude of the vehicle 1 with respect to a reference attitude, based on changes of the feature points among the images.

Figure 27:
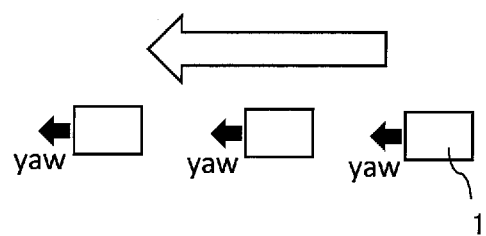
FIG. 27 is a diagram for explaining straightforward traveling of the vehicle 1 provided with the positioning apparatus 12 according to the second embodiment.
Figure 28:
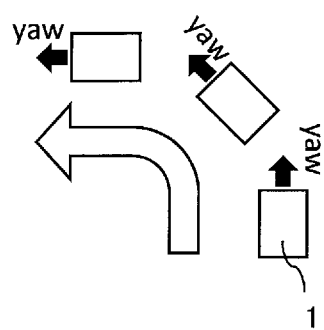
FIG. 28 is a diagram for explaining turning of the vehicle 1 provided with the positioning apparatus 12 according to the second embodiment.

FIG. 27 is a diagram for explaining straightforward traveling of the vehicle 1 provided with the positioning apparatus 12 according to the second embodiment. FIG. 28 is a diagram for explaining turning of the vehicle 1 provided with the positioning apparatus 12 according to the second embodiment. When the vehicle 1 is traveling straightforward, the rotation angle around the yaw axis is about constant with a small variance. On the other hand, when the vehicle 1 is turning, the rotation angle around the yaw axis varies with a large variance. Therefore, it is possible to determine whether or not the vehicle 1 is turning, by calculating a variance of the rotation angles around the yaw axis of the vehicle 1.

Figure 29:
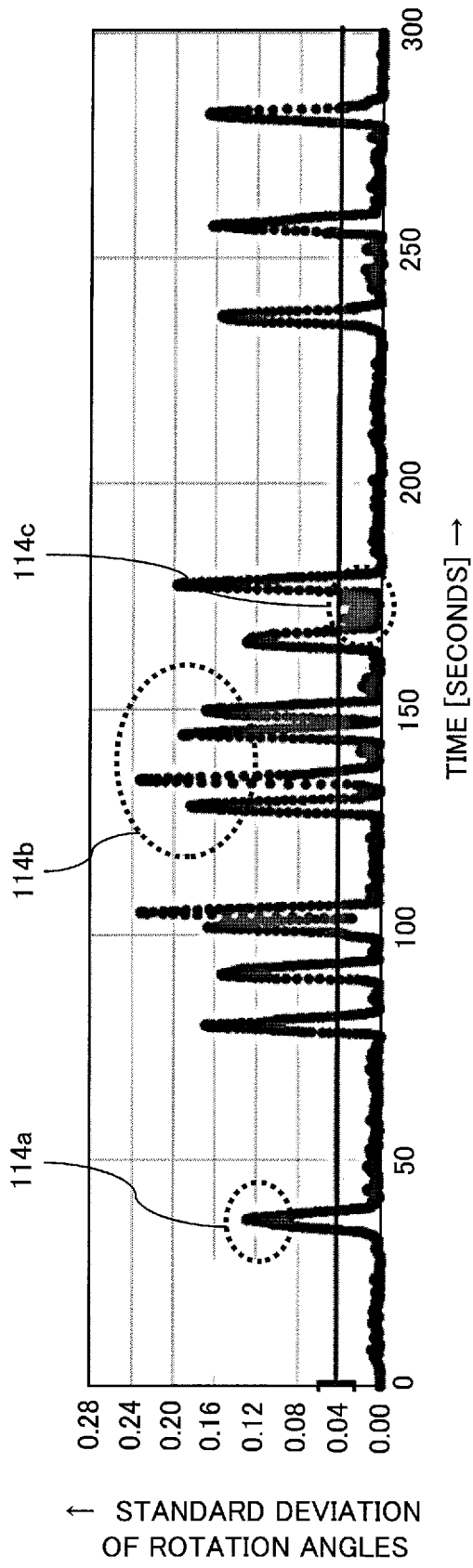
FIG. 29 is a graph showing a standard deviation of rotation angles around a yaw axis when the vehicle 1 travels in the warehouse 110 of FIG. 26.

FIG. 29 is a graph showing a standard deviation of rotation angles around the yaw axis when the vehicle 1 travels in the warehouse 110 of FIG. 26. Regions 114a to 114c of FIG. 29 indicate corresponding sections 114a to 114c of FIG. 26. Each of the sections 114a and 114b of FIG. 26 includes a corner of the passageways 111, at which the vehicle 1 turns. On the other hand, the section 114c of FIG. 26 has a rough floor surface of a warehouse 220, and thus the variance of the rotation angles around the yaw axis increases even if the vehicle 1 is not turning. Therefore, it is necessary to distinguish an increase in a variance caused by turning of the vehicle 1, from an increase in a variance caused for other reasons. In the example of FIG. 29, for example, a threshold of 0.04 is used, and it is possible to determine that the vehicle 1 is turning when the standard deviation of the rotation angles [rad] is larger than 0.04, and the vehicle 1 is not turning when the standard deviation of the rotation angles is 0.04 or smaller.

In addition, the corrector 36 may determine whether or not the vehicle 1 is turning, based on the rotation angle around the yaw axis of the vehicle 1, for example, based on a difference between rotation angles calculated at a first and a second time moments separated by a certain time length from each other.

In addition, when the absolute attitude of the vehicle 1 is calculated based on the marker 4 included in a field of view of the image capturing apparatus 11, the corrector 36 may determine whether or not the vehicle 1 is turning, based on a change in the absolute attitude. The corrector 36 may calculate a rotation angle around the yaw axis of the vehicle 1, or a variance of the rotation angles, based on the change in the absolute attitude, and when the calculated value of the rotation angle or the variance of the rotation angles is larger than a predetermined threshold, the corrector 36 may determine that the vehicle is turning.

Further, the corrector 36 may determine whether or not the vehicle 1 is turning, based on a combination of a change in the relative attitude and a change in the absolute attitude.

In addition, the corrector 36 may determine whether or not the vehicle 1 is turning, based on a difference between a first image and a second image captured by the image capturing apparatus 11 at a first and a second time moments separated by a certain time length from each other. In this case, the corrector 36 may capture an image of a predetermined landmark, and determine whether or not the vehicle 1 is turning, based on the images of the landmark. For example, a change in the images of the landmark captured at the time moments separated by the certain time length from each other (for example, a change in an optical flow or the like) differs between when the vehicle 1 is traveling straightforward, and when the vehicle 1 is turning. Therefore, the corrector 36 may distinguish between straightforward traveling and turning of the vehicle, based on learning result data obtained by performing machine learning for the images of the landmark.

In addition, the corrector 36 may determine whether or not the vehicle 1 is turning, based on shapes of the passageways 101 included in the map information stored in the storage apparatus 35, and based on a current position of the vehicle 1. In other words, the corrector 36 may determine, based on the map information, whether the vehicle 1 is travelling in a place of the passageway 101 where the vehicle 1 would surely turns (for example, a corner), or in a place of the passageway 101 where the vehicle 1 would surely not turn (for example, a straight section), and thus, determine whether or not the vehicle 1 is turning. The current position of the vehicle 1 can be determined from the calculated relative or absolute position.

In step S44 of FIG. 25, the corrector 36 calculates a corrected amount of rotation of the vehicle 1 based on the relative attitude and the absolute attitude of the vehicle 1. Step S44 of FIG. 25 is similar to step S33 of FIG. 14 according to the first embodiment.

In step S45 of FIG. 14, the corrector 36 adds the corrected amount of rotation of the vehicle 1 to the relative attitude of the vehicle 1. If NO in step S43, the corrector 36 in this case calculates a corrected attitude using the corrected amount of rotation calculated in step S44. On the other hand, if YES in step S43, the corrector 36 ends the correction process (S4A)

without calculating the corrected amount of rotation. Thus, the corrector 36 generates the corrected attitude not using the absolute attitude calculated in the period in which the vehicle 1 is turning, but using only the absolute attitude calculated in the period in which the vehicle 1 is not turning. Note that if YES in step S43, the corrected amount of rotation calculated and stored in the period in which the vehicle 1 is not turning may be added to the relative attitude (step S45).

Figure 30:
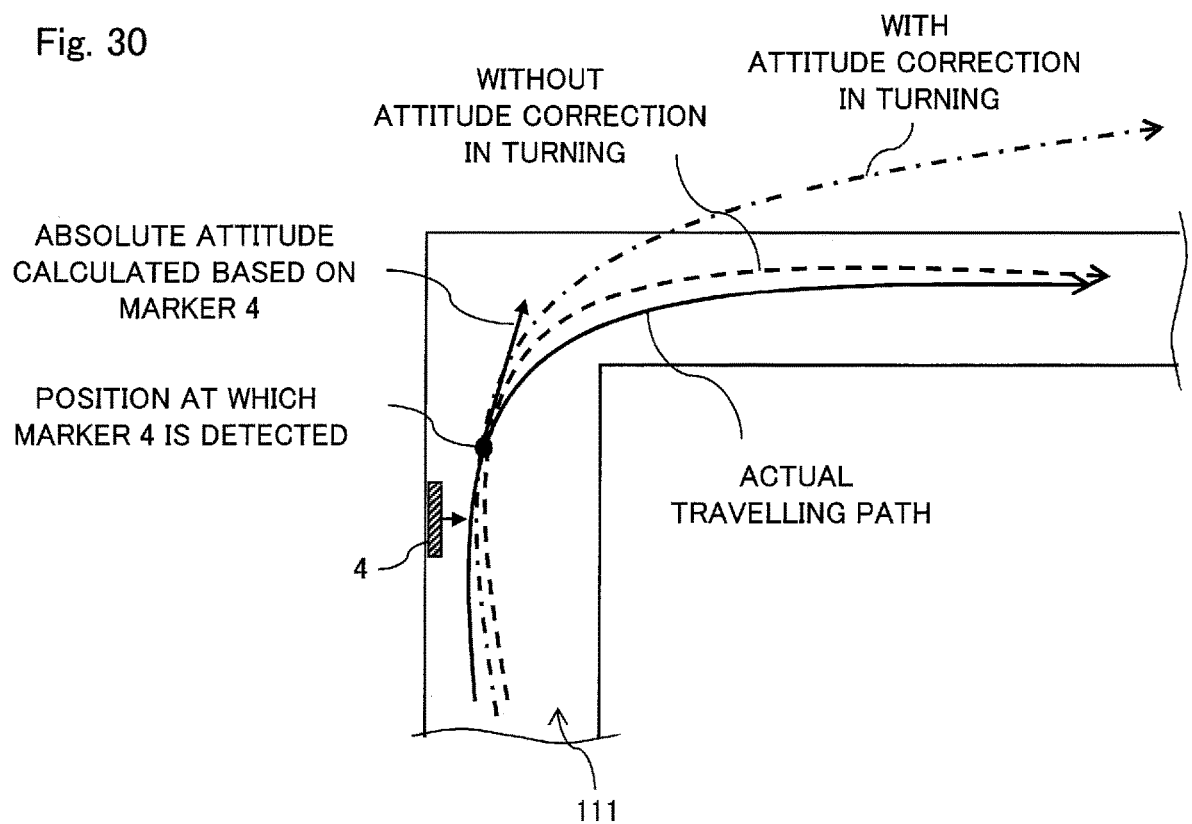
FIG. 30 is a diagram showing a trajectory of the vehicle 1 calculated when the vehicle 1 provided with the positioning apparatus 12 according to the second embodiment passes through a corner of the passageway 111.

FIG. 30 is a diagram showing a trajectory of the vehicle 1 calculated when the vehicle 1 provided with the positioning apparatus 12 according to the second embodiment passes through a corner of the passageway 111. In the example of FIG. 30, when the vehicle 1 is passing through the corner of the passageway 111, the positioning apparatus 12 detects the marker 4, and calculates the absolute attitude based on the marker 4. The absolute attitude calculated in the period in which the vehicle 1 is turning includes an error. Therefore, when calculating a corrected attitude using the absolute attitude calculated in the period in which the vehicle 1 is turning (with attitude correction in turning), the position and the trajectory of the vehicle 1 significantly differ from the actual position and trajectory. On the other hand, when not using the absolute attitude calculated in the period in which the vehicle 1 is turning (without attitude correction in turning), the position and the trajectory of the vehicle 1 are closer to the actual position and the actual trajectory.

Figure 31:
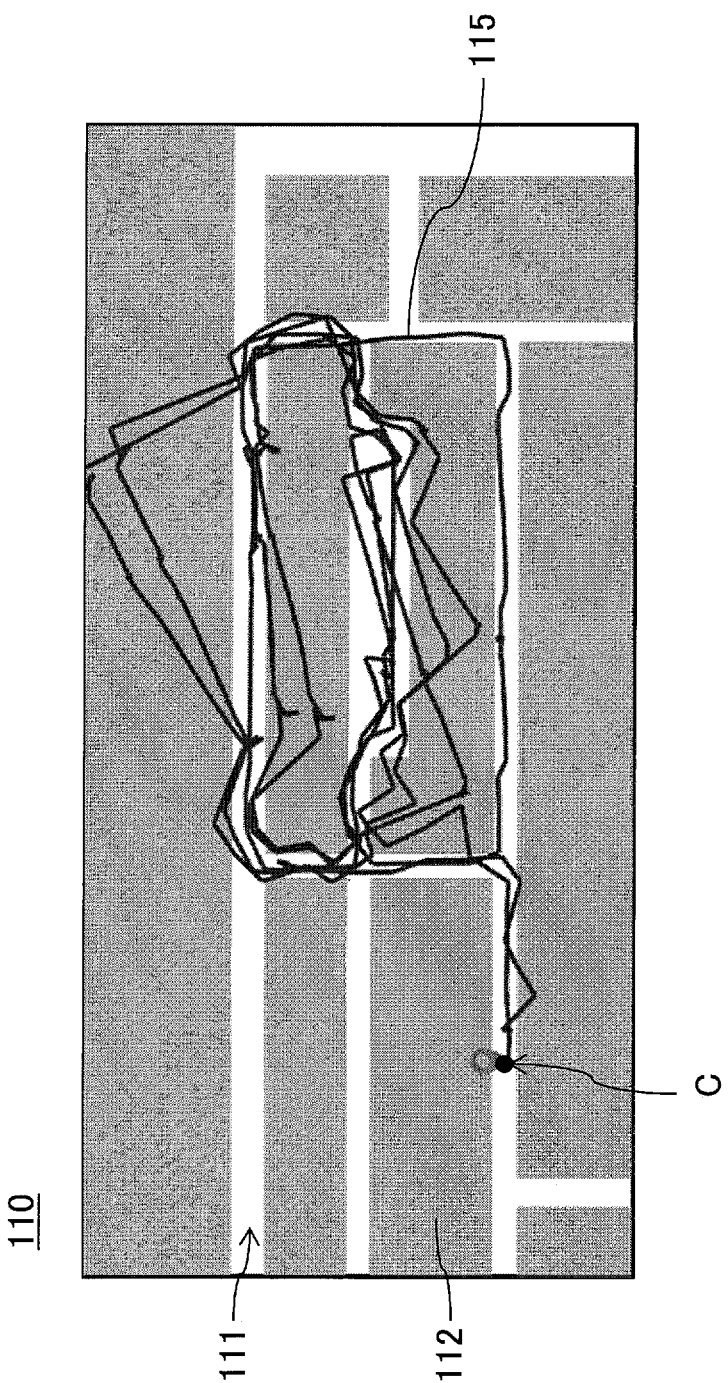
FIG. 31 is a diagram showing a trajectory 115 of the vehicle 1 calculated by executing a correction process according to a comparison example of the second embodiment.
Figure 32:
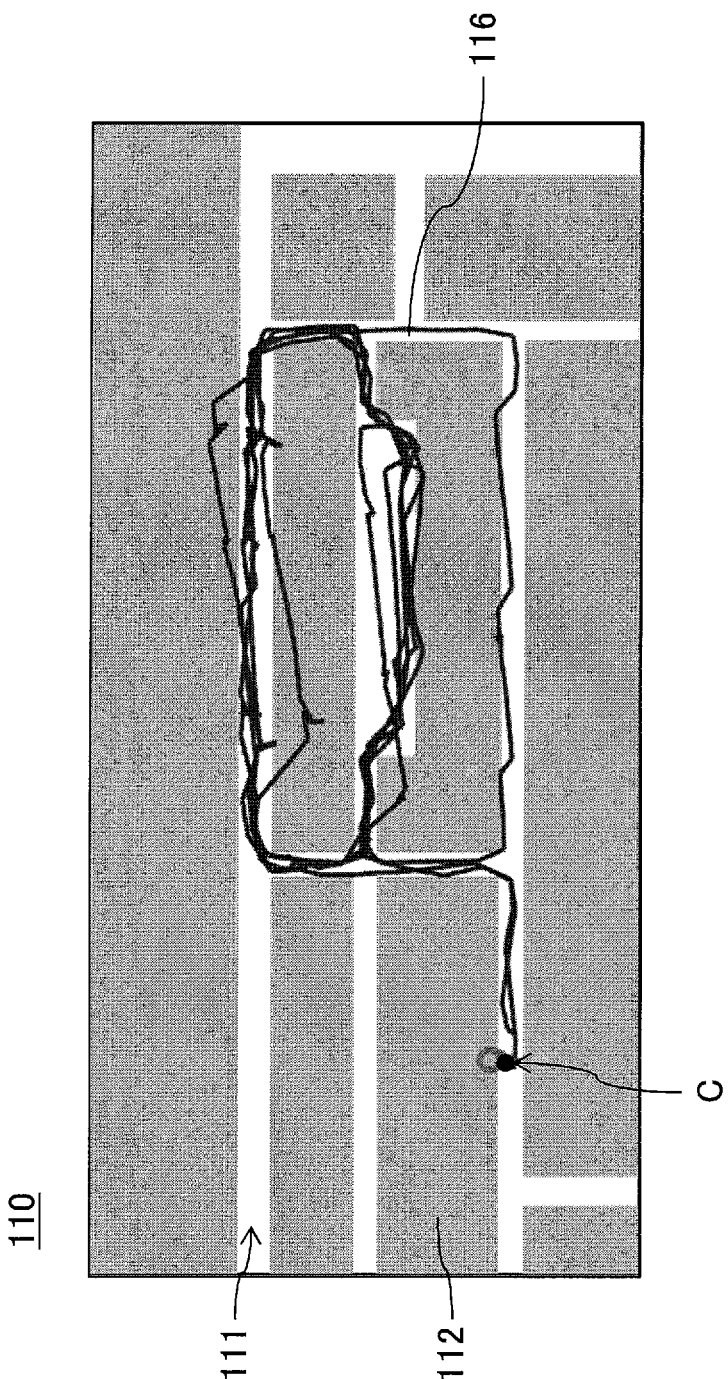
FIG. 32 is a diagram showing a trajectory 116 of the vehicle 1 calculated by executing the correction process of FIG. 25.

FIG. 31 is a diagram showing a trajectory 115 of the vehicle 1 calculated by executing a correction process according to a comparison example of the second embodiment. FIG. 32 is a diagram showing a trajectory 116 of the vehicle 1 calculated by executing the correction process of FIG. 25. In addition, each of FIGS. 31 and 32 shows a trajectory of the vehicle 1 calculated when the vehicle 1 travels from a point C as an origination, to the point C as a destination. In addition, in FIGS. 31 and 32, the markers 4 are omitted for ease of illustration. FIG. 31 shows a case where step S43 of FIG. 25 is not executed, and the relative attitude is always corrected based on the absolute attitude, regardless of whether or not the vehicle 1 is turning. According to FIG. 31, the corrected attitude is calculated using the absolute attitude calculated in the period in which the vehicle 1 is turning, and as a result, the calculated trajectory 103 of the vehicle 1 meanders and largely protrude from the passageway 101. On the other hand, according to FIG. 32, it is possible to reduce effects of the errors by not using the absolute attitude calculated in the period in which the vehicle 1 is turning, and meandering and protrusion have decreased in the calculated trajectory 104 of the vehicle 1.

When the vehicle 1 is turning, errors in the relative position and the relative attitude increase in comparison with errors in the absolute position and the absolute attitude, and in particular, the error in the relative position increases. An experiment conducted by the inventor of the present application has revealed that when the marker 4 can not be detected when the vehicle 1 is turning, accuracy of the position and the attitude of the vehicle 1 degrade due to the low-accuracy relative attitude, even if the relative attitude calculated during turning is corrected using the absolute attitude calculated based on the "most recently" detected marker 4. Thus, the trajectory of the vehicle 1 having the corrected attitude protrudes from the passageway 101.

According to the second embodiment, the relative position and the relative attitude calculated from the feature points 41 using Visual-SLAM or the like are corrected based on the absolute position and absolute attitude calculated from the markers 4, and therefore, it is possible to accurately measure the position and the attitude of the vehicle 1. In addition, according to the second embodiment, the absolute attitude calculated in the period in which the vehicle 1 is turning is not used for generating the corrected attitude, and therefore, it is possible to reduce an effect of an error in the absolute attitude, and more accurately measure the position and the attitude of the vehicle 1.

In addition, an experiment conducted by the inventor of the present application has revealed that the position and the attitude of the vehicle 1 calculated by the positioning apparatus 12 is less affected by the error in the relative position and the absolute position, than affected by the error in the relative attitude and the absolute attitude. Therefore, in the example of FIG. 25, the corrector 36 generates a corrected position (step S41 to S42) using the absolute positions calculated both in the period in which the vehicle 1 is turning and in the period in which the vehicle 1 is not turning. However, for reducing the effect of the error in the relative position and the absolute position, the corrector 36 may generate the corrected position not using the absolute position calculated in the period in which the vehicle 1 is turning, but using only the absolute position calculated in the period in which the vehicle 1 is not turning.

Modified Embodiment of Second Embodiment

Figure 33:
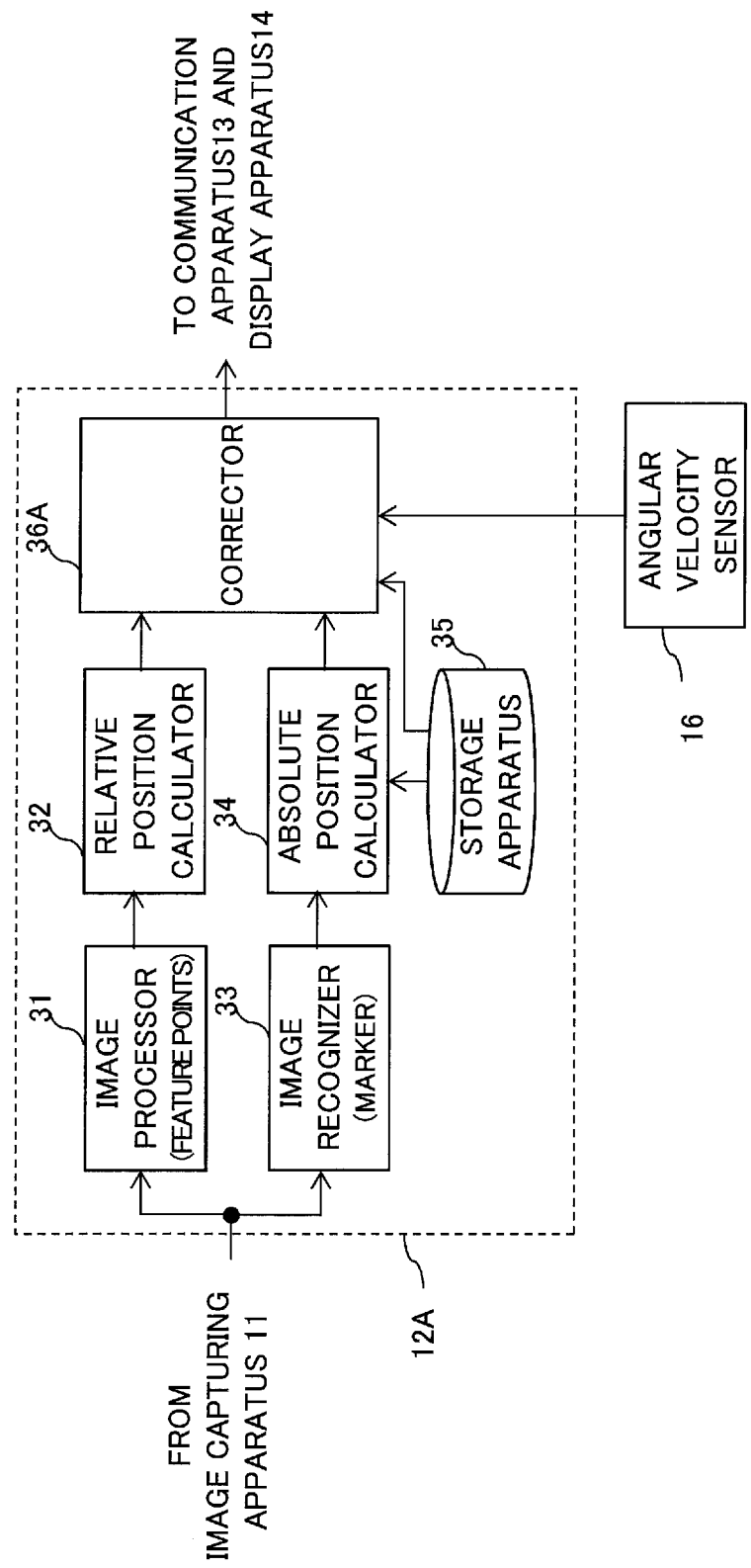
FIG. 33 is a block diagram showing a configuration of a positioning apparatus 12A according to a modified embodiment of the second embodiment.

FIG. 33 is a block diagram showing a configuration of a positioning apparatus 12A according to a modified embodiment of the second embodiment. The positioning apparatus 12A is provided with a corrector 36A, instead of the corrector 36 of FIG. 3. The corrector 36A obtains sensor data including an angular velocity of the vehicle 1 generated by an angular velocity sensor 16 mounted on the vehicle 1. The angular velocity sensor 16 is, for example, a gyro sensor. The angular velocity sensor 16 may be fixed integrally with the inside or outside the housing of the image capturing apparatus 11, or may be fixed near the image capturing apparatus 11. The corrector 36A determines whether or not the vehicle 1 is turning, based on the angular velocity of the vehicle 1. The corrector 36A may determine that the vehicle 1 is turning, when the angular velocity of the vehicle 1 is higher than a predetermined threshold (for example, 0.1 rad/sec).

As described above, when determining whether or not the vehicle 1 is turning, based on a change in the relative attitude or the absolute attitude (i.e., based on images captured by the image capturing apparatus 11), the images may vary due to, for example, variations of lighting or a background, and therefore, an error may occur in calculation of the relative attitude or the absolute attitude. This error may cause an error in determining whether or not the vehicle 1 is turning. In this case, the corrector 36A may determine whether or not the vehicle 1 is turning, based on an angular velocity of the vehicle 1, instead of a change in the relative attitude or the absolute attitude. Thus, the corrector 36A can accurately and stably determine whether or not the vehicle 1 is turning, while reducing an effect of changes in the images due to, for example, variations in the lighting or the background.

In addition, the corrector 36A may determine whether or not the vehicle 1 is turning, with reference to the angular velocity of the vehicle 1, as well as a change of the relative attitude or the absolute attitude. When one of the change in the relative attitude or the absolute attitude, and the angular velocity of the vehicle 1 is considered to be inaccurate, the corrector 36A may determine whether or not the vehicle 1 is turning, based on the other. For example, when the vehicle 1 travels on a rough road surface, the angular velocity of the vehicle 1 detected by the angular velocity sensor 16 may sensitively vary in response to the rough road surface. In this case, the corrector 36A may determine whether or not the vehicle 1 is turning, based on the change in the relative attitude or the absolute attitude, rather than the angular velocity of the vehicle 1. Thus, the corrector 36A can accurately and stably determine whether or not the vehicle 1 is turning, while reducing an effect of the rough road surface.

As described above, it is possible to accurately and stably determine whether or not the vehicle 1 is turning, using the angular velocity of the vehicle 1, instead of or in addition to the change in the relative attitude or the absolute attitude.

In addition, the corrector 36A may determine whether or not the vehicle 1 is turning, based on a state of a drive mechanism 15 of the vehicle 1. The corrector 36 may use a state of a steering apparatus included in the drive mechanism 15. When the vehicle 1 is a manned vehicle, the corrector 36 may use a state of a console 1c (for example, steering wheel).

Advantageous Effects, Etc. of Second Embodiment

According to the second embodiment, the positioning apparatus 12, 12A is provided with the first calculator, the storage apparatus 35, the second calculator, and the corrector 36, 36A. A first position and a first attitude of the vehicle 1 indicating a relative position and a relative attitude of the vehicle 1 with respect to a reference position and a reference attitude are calculated based on a plurality of images captured by the image capturing apparatus 11 mounted on the vehicle 1. Information on identifiers, positions, and attitudes of a plurality of markers 4 disposed at predetermined positions and visually distinguishable from each other is stored, and information on a map including the passageways 101 for the vehicle 1 is stored. One of the plurality of markers 4 is extracted from the images captured by the image capturing apparatus 11, and a second position and a second attitude of the vehicle 1 indicating the position and the attitude of the vehicle 1 in the map are calculated based on the position and the attitude of the one extracted marker 4. The first position and the first attitude are corrected based on the second position and the second attitude to generate a corrected position and a corrected attitude of the vehicle 1. The corrector 36, 36A determines whether or not the vehicle 1 is turning, and generates a corrected attitude not using the second attitude calculated in the period in which the vehicle 1 is turning, but using only the second attitude calculated in the period in which the vehicle 1 is not turning.

Thus, it is possible to accurately measure the position and the attitude of the vehicle 1, by correcting the relative position and the relative attitude calculated from on the feature points 41 using Visual-SLAM or the like, based on the absolute position and the absolute attitude calculated from on the marker 4. In addition, the absolute attitude calculated in the period in which the vehicle 1 is turning is not used for generating the corrected attitude, and therefore, it is possible to reduce an effect of an error in the absolute attitude, and more accurately measure the position and the attitude of the vehicle 1.

According to the second embodiment, the corrector 36, 36A may generate a corrected position using the second positions calculated both in the period in which the vehicle 1 is turning and in the period in which the vehicle 1 is not turning.

Thus, the corrector 36, 36A can continuously calculate the absolute position of the vehicle 1, and thus continuously correct the position of the vehicle 1.

According to the second embodiment, the corrector 36 may determine whether or not the vehicle 1 is turning, based on a change in the first attitude or the second attitude.

Thus, the corrector 36 can determine whether or not the vehicle 1 is turning, based on images captured by the image capturing apparatus 11.

According to the second embodiment, the corrector 36 may calculate a rotation angle around a yaw axis of the vehicle 1, or a variance of the rotation angles, based on a change in the first attitude or the second attitude, and when the calculated value of the rotation angle or the variance of the rotation angles is larger than a predetermined threshold, the corrector 36 may determine that the vehicle 1 is turning.

Thus, the corrector 36 can generate the corrected attitude not using the absolute attitude calculated in the period in which the vehicle 1 is turning at a rotation angle or a variance of the rotation angles larger than a threshold, but using only the absolute attitude calculated in the period in which the vehicle 1 is turning at a rotation angle or a variance of the rotation angles smaller than the threshold.

According to the second embodiment, the corrector 36A may obtain sensor data including an angular velocity of the vehicle 1 generated by the angular velocity sensor 16 mounted on the vehicle 1, and may determine whether or not the vehicle 1 is turning, based on the angular velocity of the vehicle 1.

Thus, the corrector 36A can determine whether or not the vehicle 1 is turning, based on the angular velocity of the vehicle 1 generated by the angular velocity sensor 16.

According to the second embodiment, the corrector 36A may determine that the vehicle 1 is turning, when the angular velocity of the vehicle 1 is higher than a predetermined threshold.

Thus, the corrector 36A can generate a corrected attitude not using the absolute attitude calculated in the period in which the vehicle 1 is turning at a rotation angle or a variance of the rotation angles larger than the threshold, but using only the absolute attitude calculated in the period in which the vehicle 1 is turning at a rotation angle or a variance of the rotation angles smaller than the threshold.

According to the second embodiment, the corrector 36 may determine whether or not the vehicle 1 is turning, based on shapes of the passageways 101 included in the map, and based on a current position of the vehicle 1.

According to the second embodiment, the corrector 36 may determine whether or not the vehicle 1 is turning, based on a state of a steering apparatus of the vehicle 1.

According to the second embodiment, the vehicle 1 provided with the image capturing apparatus 11 and the positioning apparatus 12 may be provided.

In addition, the first embodiment (correcting the relative attitude of the vehicle 1 based on the direction of the passageway 101) and the second embodiment (not using the absolute attitude calculated in the period in which the vehicle 1 is turning) may be combined with each other.

Third Embodiment

Figure 34:
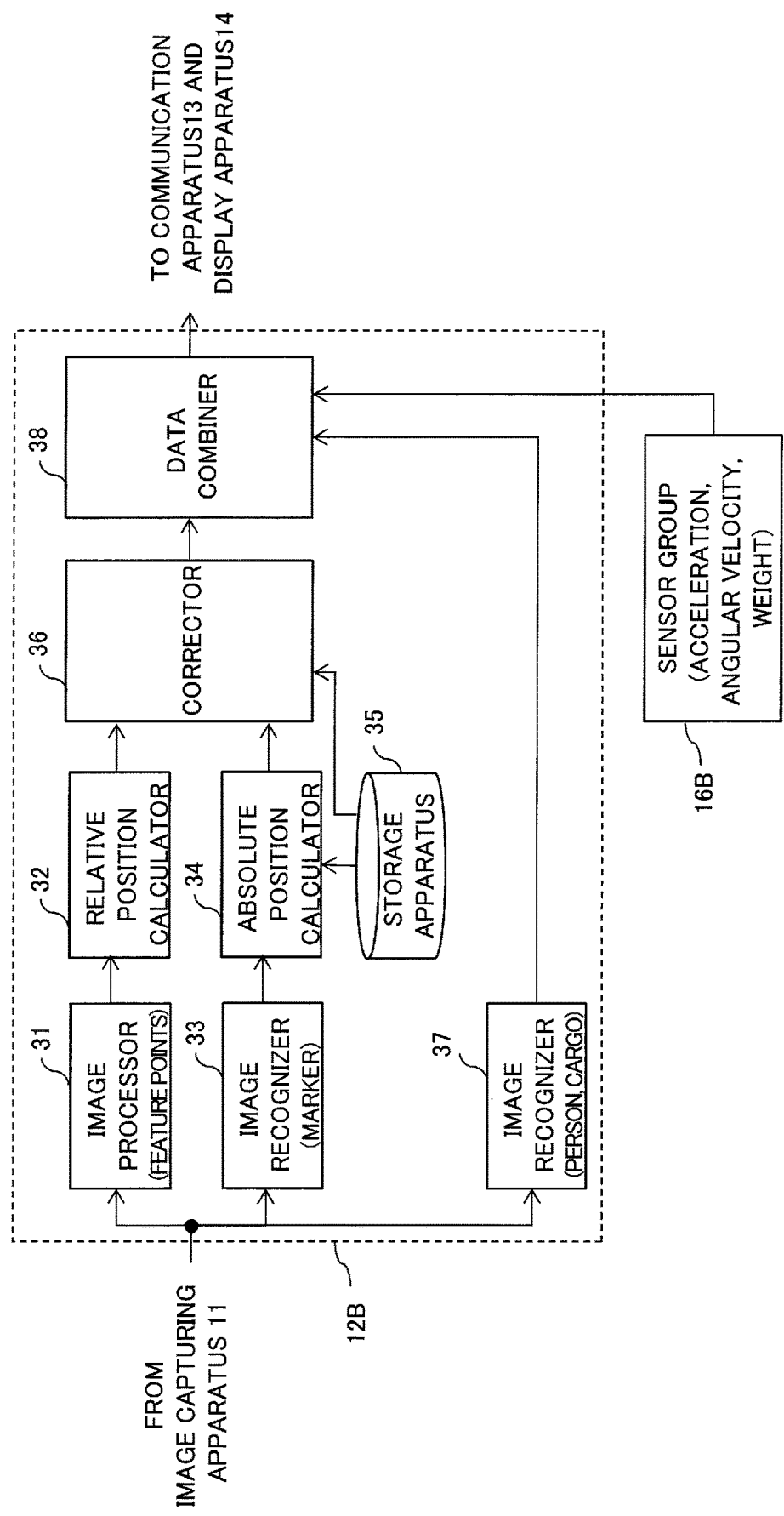
FIG. 34 is a block diagram showing a configuration of a positioning apparatus 12B according to a third embodiment.

With reference to FIG. 34, a positioning apparatus according to a third embodiment, and a moving body provided with such a positioning apparatus will be described.

[Configuration of Third Embodiment]

FIG. 34 is a block diagram showing a configuration of a positioning apparatus 12B according to a third embodiment.

A vehicle 1 according to the first or second embodiment may be provided with a positioning apparatus 12B, instead of the positioning apparatus 12 of FIG. 3. The positioning apparatus 12B is provided with an image recognizer 37 and a data combiner 38, in addition to the components of the positioning apparatus 12 of FIG. 3.

The image recognizer 37 recognizes a predetermined target object from an image captured by the image capturing apparatus 11. The image recognizer 37 may recognize a person (for example, a driver of the vehicle 1, or a person around the vehicle 1). The image recognizer 37 may recognize specific cargo 3 learned in advance. The image processor 31, the image recognizer 33, and the image recognizer 37 may obtain images from the same image capturing apparatus 11. Alternatively, the image recognizer 37 may capture an image including a person and/or the cargo 3, using an image capturing apparatus different from the image capturing apparatus 11 for capturing images to be supplied to the image processor 31 and the image recognizer 33 (i.e., images for measuring the position and the attitude of the vehicle 1). In this case, the image capturing apparatus 11 may be provided, for example, so as to capture images of the passageway 101 in front of the vehicle 1, while the other image capturing apparatus may be provided, for example, so as to capture a driver's seat or a cargo carrier of the vehicle 1. The image capturing apparatus 11 and the other image capturing apparatus are synchronized with each other in advance.

The data combiner 38 obtains data of the corrected position and the corrected attitude of the vehicle 1 from the corrector 36, together with a timestamp indicating a time moment at which an image corresponding to the position and the attitude is captured by the image capturing apparatus 11 (or a time moment at which the position and the attitude are calculated). The data combiner 38 combines image recognition data of the target object recognized by the image recognizer 37, with the data of the position and the attitude of the vehicle 1. In addition, the data combiner 38 obtains sensor data generated by a sensor group 16B including one or more sensors mounted on the vehicle 1, and combines the sensor data with the data of the position and the attitude of the vehicle 1. The data combiner 38 may obtains sensor data including at least one of an acceleration and an angular velocity of the vehicle 1. In addition, the data combiner 38 may also obtain sensor data including a weight of the cargo 3 carried by the vehicle 1. Sensors of the sensor group 16B provide sensor data with a timestamp indicating a time moment when the sensor data is obtained. The data combiner 38 combines these data in synchronization with each other, based on the timestamp of the data of the position and the attitude of the vehicle 1, the timestamp of the image recognition data, and the timestamp of the sensor data.

When the timestamps of these data differ from each other, the data combiner 38 may associate the image recognition data or the sensor data, with the position and attitude data of the vehicle 1 having a timestamp closest to that of the image recognition data or the sensor data. In addition, when the timestamps of these data differ from each other, the data combiner 38 may interpolate the data of the position and the attitude of the vehicle 1 using linear interpolation, internal division, or the like, and associate the image recognition data or the sensor data, with the position data and the attitude data of the vehicle 1 interpolated and having a timestamp corresponding to the image recognition data or the sensor data.

Since the data combiner 38 is provided, it is possible to record various data associated with work of the vehicle 1 in association with the position and the trajectory of the vehicle 1. For example, a person associated with the work of the vehicle 1 can be tracked by recording a person recognized by image recognition. The cargo 3 carried by the vehicle 1 can be tracked by recording the cargo 3 recognized by image recognition. A rough road surface of a warehouse or the like can be detected by recording the acceleration and the angular velocity of the vehicle 1. A workload of the vehicle 1 can be monitored by recording a weight of the cargo 3.

Advantageous Effects, Etc. of Third Embodiment

According to the third embodiment, the data combiner 38 may be further provided for obtaining sensor data generated by one or more sensors mounted on the vehicle 1, and combines sensor data with data of the corrected position and the corrected attitude.

According to the third embodiment, the data combiner 38 may obtain sensor data including at least one of an acceleration and an angular velocity of the vehicle 1.

According to the third embodiment, the data combiner 38 may obtain sensor data including a weight of the cargo 3 carried by the vehicle 1.

According to the third embodiment, the positioning apparatus 12B may be further provided with the image recognizer 37 that recognizes a predetermined target object from an image captured by the image capturing apparatus 11. In this case, the data combiner 38 combines information on the target object recognized by the image recognizer 37, with the data of the corrected position and the corrected attitude.

According to the third embodiment, the image recognizer 37 may recognize a person.

According to the third embodiment, the image recognizer 37 may recognize the specific cargo 3 learned in advance.

According to the third embodiment, various data associated with work of the vehicle 1 can be recorded in association with the position and the trajectory of the vehicle 1.

According to the third embodiment, the vehicle 1 may be provided with the image capturing apparatus 11 that captures images for measuring the position and the attitude of the vehicle 1, and a different image capturing apparatus that captures a further target object. In this case, the data combiner 38 can associate data of the position and the attitude data of the vehicle 1 generated based on images captured by the image capturing apparatus 11, with image recognition data generated based on the image captured by the further image capturing apparatus. When the data of the position and the attitude of the vehicle 1 is associated with the image recognition data of the different target object captured during movement of the vehicle 1, this association is considerably useful for work analysis performed based on the position and the trajectory of the vehicle 1 on the map. For example, when a person's suspicious activity is detected by visual inspection or the like, the person's position is determined on the map, and therefore, it is possible to search and retrieve an image or a video captured in the past in the vicinity of the person's position, and/or in association with the person.

OTHER EMBODIMENTS

In the first to third embodiments, the positioning apparatus may be provided on a four-wheel vehicle, such as a forklift or a truck, or may be provided on vehicles with one to three, five or more wheel. In addition, in the first to third embodiments, the positioning apparatus may be provided on a moving body without wheels, such as an airplane, a helicopter, a drone, and a hovercraft, regardless of the number of wheels and/or the presence/absence of wheels.

The positioning apparatus according to the present embodiments can estimate a position of a moving body not based on a number of rotation of wheels, but based on an image captured by an image capturing apparatus.

According to the positioning apparatus of aspects of the present disclosure, it is possible to measure a position of a moving body in a warehouse, a factory, or the like. Accordingly, it is possible to track a trajectory (flow) of the moving body, route the moving body, optimize an arrangement of cargo or the like in a warehouse or a factory, monitor an operating rate, improving work efficiency, and the like are achievable.

The invention claimed is:

1. A moving body comprising:
a camera that is mounted on the moving body and captures a plurality of images; and
a circuit, wherein the circuit performs:
extracting feature points from each of the plurality of images captured by the camera, and calculating a first position and a first attitude of the moving body indicating a relative position and a relative attitude of the moving body with respect to a reference position and a reference attitude, based on the extracted feature points;
storing information on identifiers, positions, and attitudes of a plurality of markers disposed at predetermined positions and visually distinguishable from each other, and information on a map containing a passageway for the moving body, wherein the plurality of markers are AR markers;
extracting one of the plurality of markers from an image captured by the camera, and calculating a second position and a second attitude of the moving body indicating a position and an attitude of the moving body in the map, based on a position and an attitude of the one extracted marker; and
correcting the first position and the first attitude based on the second position and the second attitude to generate a corrected position and a corrected attitude of the moving body,
wherein, when the one extracted marker is disposed along the passageway, and an angular difference between a traveling direction of the moving body having the corrected position and the corrected attitude, and a direction of the passageway is smaller than a predetermined first threshold, the circuit corrects the first attitude based on the direction of the passageway, instead of the second attitude.

2. The moving body as claimed in claim 1,
wherein, when an angular difference between a direction of the second attitude and the direction of the passageway is smaller than the first threshold, the circuit corrects the first attitude based on the direction of the passageway, instead of the second attitude.

3. The moving body as claimed in claim 1,
wherein, when an angular difference between a direction of a vector indicating a most recent movement of the moving body having the corrected position, and the direction of the passageway is smaller than the first threshold, the circuit corrects the first attitude based on the direction of the passageway, instead of the second attitude.

4. The moving body as claimed in claim 3,
wherein the circuit calculates directions of vectors indicating most recent movements of the moving body having the corrected position, over a predetermined time length, or in correspondence with a predetermined number of consecutive images, and
wherein, when an angular difference between an average of the directions of the vectors, and the direction of the passageway is smaller than the first threshold, the circuit corrects the first attitude based on the direction of the passageway, instead of the second attitude.

5. The moving body as claimed in claim 1,
wherein the circuit corrects an average of a plurality of the first attitudes based on the second attitude or the direction of the passageway, the plurality of first attitudes being calculated over a predetermined time length or in correspondence with a predetermined number of consecutive images.

6. The moving body as claimed in claim 1,
wherein the circuit determines whether or not the moving body is turning, and generates the corrected attitude not using the second attitude calculated during a period in which the moving body is turning, but using only the second attitude calculated during a period in which the moving body is not turning.

7. The moving body as claimed in claim 6,
wherein the circuit determines whether or not the moving body is turning, based on a change in the first attitude or the second attitude.

8. The moving body as claimed in claim 7,
wherein the circuit calculates a rotation angle around a yaw axis of the moving body, or a variance of rotation angles, based on the change in the first attitude or the second attitude, and when a calculated value of the rotation angle or the variance is larger than a predetermined second threshold, the circuit determines that the moving body is turning.

9. The moving body as claimed in claim 6, further comprising an angular velocity sensor that is mounted on the moving body and generates sensor data including an angular velocity of the moving body,
wherein the circuit obtains the sensor data including the angular velocity of the moving body, and determines whether or not the moving body is turning, based on the angular velocity of the moving body.

10. The moving body as claimed in claim 9,
wherein, when the angular velocity of the moving body is higher than a predetermined third threshold, the circuit determines that the moving body is turning.

11. The moving body as claimed in claim 1, further comprising one or more sensors that is mounted on the moving body and generates sensor data,
wherein the circuit obtains the sensor data, and combines data of the corrected position and the corrected attitude, with the sensor data.

12. The moving body as claimed in claim 11,
wherein the circuit obtains sensor data including at least one of an acceleration and an angular velocity of the moving body.

13. The moving body as claimed in claim 11,
wherein the circuit obtains sensor data including a weight of cargo carried by the moving body.

14. The moving body as claimed in claim 11,
wherein the circuit recognizes a predetermined target object from an image captured by the camera, and
wherein the circuit combines the data of the corrected position and the corrected attitude, with information on the recognized target object.

15. The moving body as claimed in claim 14,
wherein the circuit recognizes a person as the target object.

16. The moving body as claimed in claim 14,
wherein the circuit recognizes specific cargo learned in advance, as the target object.

17. A moving body comprising:
a camera that is mounted on the moving body and captures a plurality of images; and
a circuit, wherein the circuit performs:
extracting feature points from each of the plurality of images captured by the camera, and calculating a first position and a first attitude of the moving body indicating a relative position and a relative attitude of the moving body with respect to a reference position and a reference attitude, based on the extracted feature points using Visual-SLAM;
storing information on identifiers, positions, and attitudes of a plurality of markers disposed at predetermined positions and visually distinguishable from each other, and information on a map containing a passageway for the moving body;
extracting one of the plurality of markers from an image captured by the camera, and calculating a second position and a second attitude of the moving body indicating a position and an attitude of the moving body in the map, based on a position and an attitude of the one extracted marker; and
correcting the first position and the first attitude based on the second position and the second attitude to generate a corrected position and a corrected attitude of the moving body,
wherein, when the one extracted marker is disposed along the passageway, and an angular difference between a traveling direction of the moving body having the corrected position and the corrected attitude, and a direction of the passageway is smaller than a predetermined first threshold, the circuit corrects the first attitude based on the direction of the passageway, instead of the second attitude.

* * * * *